United States Patent
Nair et al.

(10) Patent No.: US 9,375,678 B2
(45) Date of Patent: Jun. 28, 2016

(54) METAL-ORGANIC FRAMEWORK SUPPORTED ON POROUS POLYMER

(71) Applicants: Sankar Nair, Atlanta, GA (US); Andrew Brown, Atlanta, GA (US); Christopher W. Jones, Atlanta, GA (US)

(72) Inventors: Sankar Nair, Atlanta, GA (US); Andrew Brown, Atlanta, GA (US); Christopher W. Jones, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 433 days.

(21) Appl. No.: 13/897,939

(22) Filed: May 20, 2013

(65) Prior Publication Data
US 2013/0313193 A1 Nov. 28, 2013

Related U.S. Application Data

(60) Provisional application No. 61/651,593, filed on May 25, 2012.

(51) Int. Cl.
*B01D 53/22* (2006.01)
*B01D 71/02* (2006.01)
(Continued)

(52) U.S. Cl.
CPC .......... *B01D 53/228* (2013.01); *B01D 67/0051* (2013.01); *B01D 67/0079* (2013.01); *B01D 69/148* (2013.01); *B01D 71/028* (2013.01);
(Continued)

(58) Field of Classification Search
CPC ............. B01D 53/228; B01D 67/0011; B01D 67/0051; B01D 67/0079; B01D 69/148; B01D 71/028; B01D 71/58; B01D 2257/504; B01D 2257/70; B01D 2257/80; Y02C 10/10
USPC .................... 95/50, 51, 52; 96/11, 12, 13, 14
See application file for complete search history.

(56) References Cited

U.S. PATENT DOCUMENTS

| | | | |
|---|---|---|---|
| 5,968,366 | A | 10/1999 | Deckman et al. |
| 6,953,493 | B2 | 10/2005 | Nakayama et al. |
| 7,014,680 | B2 | 3/2006 | Nakayama et al. |

(Continued)

FOREIGN PATENT DOCUMENTS

| | | |
|---|---|---|
| CN | 1617761 A | 5/2005 |
| CN | 1914219 A | 2/2007 |

(Continued)

OTHER PUBLICATIONS

Liu, Yungang et al., "Synthesis of highly c-oriented ZIF-69 membranes by secondary growth and their gas permeation properties", Journal of Membrane Science, Jun. 2011, vol. 379, pp. 46-51.*

(Continued)

*Primary Examiner* — Jason M Greene
(74) *Attorney, Agent, or Firm* — Gardere Wynne Sewell LLP; Chris P. Perque; Teresa J. Lechner-Fish

(57) ABSTRACT

The growth of continuous MOF membranes on porous polymeric supports is reported, wherein a dip-coating procedure is used to deposit a layer of seed MOF nanocrystals on the surfaces of porous polymers, preferably in the form of hollow fibers, and polycrystalline MOF membranes are subsequently grown at temperatures as low as 65° C. from precursor solutions. The present work opens the road to inexpensive and scalable fabrication of MOF membranes for large-scale separation applications.

34 Claims, 6 Drawing Sheets

(51) Int. Cl.
*B01D 67/00* (2006.01)
*B01D 69/14* (2006.01)

(52) U.S. Cl.
CPC .......... B01D 2257/504 (2013.01); Y02C 10/10 (2013.01)

(56) References Cited

U.S. PATENT DOCUMENTS

| | | | |
|---|---|---|---|
| 7,306,647 | B2 | 12/2007 | Miller et al. |
| 7,494,610 | B2 | 2/2009 | Yeung et al. |
| 7,553,352 | B2 | 6/2009 | Mueller et al. |
| 7,880,026 | B2 | 2/2011 | Ni et al. |
| 7,973,090 | B2 | 7/2011 | Suzuki et al. |
| 8,042,695 | B2 | 10/2011 | Ishibashi |
| 8,123,834 | B2 | 2/2012 | Masel et al. |
| 8,132,678 | B2 | 3/2012 | Liu et al. |
| 8,269,029 | B2 | 9/2012 | Masel et al. |
| 8,302,782 | B2 | 11/2012 | Falconer et al. |
| 8,518,153 | B2 | 8/2013 | Ryan et al. |
| 8,673,057 | B2 | 3/2014 | Zhou et al. |
| 8,725,482 | B2 | 5/2014 | Haldoupis et al. |
| 2002/0003105 | A1 | 1/2002 | McEvoy |
| 2002/0031303 | A1 | 3/2002 | Wang |
| 2004/0058224 | A1 | 3/2004 | Eshraghi et al. |
| 2004/0139908 | A1 | 7/2004 | Bowe et al. |
| 2004/0173094 | A1 | 9/2004 | Nakayama et al. |
| 2005/0124819 | A1 | 6/2005 | Yaghi et al. |
| 2005/0204916 | A1 | 9/2005 | Falconer et al. |
| 2005/0229779 | A1 | 10/2005 | Nakayama et al. |
| 2005/0233945 | A1 | 10/2005 | Brown et al. |
| 2006/0107830 | A1 | 5/2006 | Miller et al. |
| 2006/0201884 | A1 | 9/2006 | Kulprathipanja et al. |
| 2007/0022877 | A1 | 2/2007 | Marand et al. |
| 2007/0112189 | A1* | 5/2007 | Ikeda ............... B01D 67/0051 540/536 |
| 2007/0244347 | A1 | 10/2007 | Ying et al. |
| 2008/0047432 | A1 | 2/2008 | Nonaka et al. |
| 2008/0177098 | A1 | 7/2008 | Bahnmuller et al. |
| 2008/0214686 | A1 | 9/2008 | Suzuki et al. |
| 2008/0261101 | A1 | 10/2008 | de Figueiredo Gomes et al. |
| 2008/0287413 | A1* | 11/2008 | Aslund ............... C07D 205/04 514/210.17 |
| 2009/0004084 | A1 | 1/2009 | Bell et al. |
| 2009/0011926 | A1 | 1/2009 | Yajima et al. |
| 2009/0060839 | A1 | 3/2009 | Boyes et al. |
| 2009/0111959 | A1 | 4/2009 | Cao et al. |
| 2009/0114089 | A1* | 5/2009 | Liu ............... B01D 53/228 95/45 |
| 2009/0126570 | A1 | 5/2009 | Liu et al. |
| 2009/0131643 | A1 | 5/2009 | Ni et al. |
| 2009/0152755 | A1 | 6/2009 | Liu et al. |
| 2009/0155464 | A1 | 6/2009 | Liu et al. |
| 2009/0211440 | A1 | 8/2009 | Reyes et al. |
| 2010/0006503 | A1 | 1/2010 | Bratton et al. |
| 2010/0071559 | A1 | 3/2010 | Miachon et al. |
| 2010/0072424 | A1 | 3/2010 | Petoud et al. |
| 2010/0132549 | A1 | 6/2010 | Yaghi et al. |
| 2010/0144512 | A1 | 6/2010 | Uchikawa et al. |
| 2010/0226991 | A1 | 9/2010 | Horcajada-Cortes et al. |
| 2011/0158923 | A1 | 6/2011 | Galeone et al. |
| 2011/0160039 | A1 | 6/2011 | Himeno et al. |
| 2011/0298115 | A1 | 12/2011 | Celaya et al. |
| 2011/0319630 | A1 | 12/2011 | Yaghi et al. |
| 2012/0003475 | A1 | 1/2012 | Benin et al. |
| 2012/0058302 | A1* | 3/2012 | Eggenspieler ......... B01D 65/08 428/141 |
| 2012/0070904 | A1 | 3/2012 | Stoddart et al. |
| 2012/0202006 | A1 | 8/2012 | Rimer |
| 2012/0310018 | A1* | 12/2012 | Lai ............... B01D 53/228 568/913 |
| 2013/0064747 | A1 | 3/2013 | Zhou et al. |
| 2013/0157837 | A1 | 6/2013 | Banerjee et al. |
| 2013/0197235 | A1 | 8/2013 | Thompson et al. |

FOREIGN PATENT DOCUMENTS

| | | |
|---|---|---|
| CN | 103201016 B | 9/2015 |
| JP | 2007045691 | 2/2007 |
| WO | WO-2005099885 A1 | 10/2005 |
| WO | WO-2007139766 A2 | 12/2007 |
| WO | WO-2010103856 | 9/2010 |
| WO | WO-PCT/US2012/025064 | 2/2012 |
| WO | WO-2012074487 A1 | 6/2012 |
| WO | WO-2012138418 A1 | 10/2012 |
| WO | WO-2013020968 A2 | 2/2013 |

OTHER PUBLICATIONS

Bux, Helge et al., "Zeolitic Imidazolate Framework Membrane with Molecular Sieving Properties by Microwave-Assisted Solvothermal Synthesis", Journal of the American Chemical Society, Nov. 2009, vol. 131, pp. 16000-16001.*

Bux, Helge et al., "Oriented Zeolitic Imidazolate Framework-8 Membrane with Sharp H2/C3H8 Molecular Sieve Separation", Chemistry of Materials, Mar. 2011, vol. 23, pp. 2262-2269.*

Bae, Tae-Hyun et al., "A High-Performance Gas-Separation Membrane Containing Submicrometer-Sized Metal-Organic Framework Crystals", Angew. Chem. Int. Edit., 2010, vol. 49, pp. 9863-9866.*

Centrone, Andrea et al., "Growth of Metal-Organic Frameworks on Polymer Surfaces", Journal of the American Chemical Society, Oct. 2010, vol. 132, pp. 15687-15691.*

Yao, Jianfeng et al., "Conta-diffusion synthesis of ZIF-8 films on a polymer substrate", Chem. Commun., Jan. 2011, vol. 47, pp. 2259-2561.*

Haque, Enamul et al., "Syntheis of a Metal-Organic Framework Material, Iron Terephthalate, by Ultrasound, Microwave, and Coventional Electric Heating: A Kinetic Study", Chem. Eur. J., 2010, vol. 16, pp. 1046-1052.*

Baker, Richard W., *Future directions of membrane gas separation technology*, Ind. Eng. Chem. Res., 2002, 41(6), pp. 1393-411.

Baker, Richard W. and Kaaeid Lokhandwala, *Natural gas processing with membranes: An overview*, Ind. Eng. Chem. Res., 2008, 47(7), pp. 2109-2121.

Caro, Jüergen and Manfred Noack, *Zeolite membranes—Recent developments and progress*, Micropor. Mesopor. Mater., 2008, 115, pp. 215-233.

Carreon, Moises A., et al., *Alumina-supported SAPO-34 membranes for $CO_2/CH_4$ separation*, J. Am. Chem. Soc., 2008, 130(16), pp. 5412-5413.

Chiu, W. V., et al., *Post-synthesis defect abatement of inorganic membranes for gas separation*, J. Membr. Sci., 2011, 377, pp. 182-190.

Cui, Ying, et al., *Preparation and gas separation performance of zeolite T membrane*, J. Mater. Chem., 2004, 14(5), pp. 924-932.

Cui, Ying, et al., *Preparation and gas separation properties of zeolite T membrane*, Chem. Comm., 2003, 17, pp. 2154-2155.

Favre, Eric, *Carbon dioxide recovery from post-combustion processes: Can gas permeation membranes compete with absorption?*, J. Membr. Sci., 2007, 294, pp. 50-59.

Hao, Ji Hua and Shichang Wang, *Influence of quench medium on the structure and gas permeation properties of cellulose acetate membranes*, J. Appl. Polym. Sci., 1998, 68(8), pp. 1269-1276.

Heng, Samuel, et al., *Low-temperature ozone treatment for organic template removal from zeolite membrane*, J. Membr. Sci., 2004, 243, pp. 69-78.

Himeno, Shuji, et al., *Synthesis and permeation properties of a DDR-type zeolite membrane for separation of $CO_2/CH_4$ gaseous mixtures*, Ind. Eng. Chem. Res., 2007, 46(21), pp. 6989-6997.

Huang, Aisheng and Jürgen Caro, *Cationic polymer used to capture zeolite precursor particles for the facile synthesis of oriented zeolite LTA molecular sieve membrane*, Chem. Mater., 2010, 22(15), pp. 4353-4355.

Husain, Shabbir, Mixed Matrix Dual Layer Hollow Fiber Membranes for Natural Gas Separation, Dissertation, Georgia Institute of Technology, Atlanta, GA, 2006, pp. 48-49.

(56) References Cited

OTHER PUBLICATIONS

Jee, Sang Eun and David S. Sholl, *Carbon dioxide and methane transport in DDR zeolite: Insights from molecular simulations into carbon dioxide separations in small pore zeolites*, J. Am. Chem. Soc., 2009, 131(22), pp. 7896-7904.

Jie, Xingming, et al., *Gas permeation performance of cellulose hollow fiber membranes made from the cellulose/N-methylmorpholine-N-oxide/$H_2O$ system*, J. Appl. Polym. Sci., 2004, 91(3), pp. 1873-1880.

Kanezashi, Masakoto, et al., *Gas permeation through DDR-type zeolite membranes at high temperatures*, AIChE J., 2008, 54(6), pp. 1478-1486.

Koros, William J. and Rajiv Mahajan, *Pushing the limits on possibilities for large scale gas separation: Which strategies?*, J. Membr. Sci., 2000, 175, pp. 181-196.

Kuhn, Jelan, et al., *Detemplation of DDR type zeolites by ozonication*, Micropor. Mesopor. Mater., 2009, 120, pp. 12-18.

Kumar, P. et al., *Ordered mesoporous membranes: Effects of support and surfactant removal conditions on membrane quality*, J. Membr. Sci., 2006, 279, pp. 539-547.

Kusakabe, Katsuki, et al., *Formation of a Y-type zeolite membrane on a porous alpha-alumina tube for gas separation*, Ind. Eng. Chem. Res., 1997, 36(3), pp. 649-655.

Li, Shiguang, et al., *Scale-up of SAPO-34 membranes for $CO_2/CH_4$ separation*, J. Membr. Sci., 2010, 352, pp. 7-13.

Li, Zong-Qun, et al., *Fabrication of nanosheets of a fluorescent metal-organic framework [Zn(BDC)(H2O)]n (BDC = 1,4-benzenedicarboxylate): Ultrasonic synthesis and sensing of ethylamine*, Inorganic Chemistry Communications, 2008, 11(11), pp. 1375-1377.

Lindmark, Jonas and Jonas Hedlund, *Modification of MFI membranes with amine groups for enhanced $CO_2$ selectivity*, J. Mater. Chem., 2010, 20(11), pp. 2219-2225.

Matsuda, H., et al., *Improvement of ethanol selectivity of silicalite membrane in pervaporation by silicone rubber coating*, J. Membr. Sci., 2002, 210(2), pp. 433-437.

Morris, William, et al., *Crystals as molecules: Postsynthesis covalent functionalization of zeolitic imidazolate frameworks*, J. Am. Chem. Soc., 2008, 130(38), pp. 12626-12627.

Nair, Sankar, et al., *Separation of close boiling hydrocarbon mixtures by MFI and FAU membranes made by secondary growth*, Micropor. Mesopor. Mater., 2001, 48, pp. 219-228.

Parikh, Atul N., et al., *Non-thermal calcination by ultraviolet irradiation in the synthesis of microporous materials*, Micropor. Mesopor. Mater., 2004, 76, pp. 17-22.

Sommer, Stefan and Thomas Melin, *Influence of operation parameters on the separation of mixtures by pervaporation and vapor permeation with inorganic membranes. Part 1: Dehydration of solvents*, Chem. Eng. Sci., 2005, 60, pp. 4509-4523.

Son, Won-Jin, et al., *Sonochemical synthesis of MOF-5*, Chem. Commun., 2008, 47, pp. 6336-6338.

Van Den Bergh, Johan, et al., *Modeling permeation of $CO_2/CH_4$, $N_2/CH_4$, and $CO_2/air$ mixtures across a DD3R zeolite membrane*, J. Phys. Chem., 2010, C, 114(20), pp. 9379-9389.

Van Den Bergh, J., et al., *Separation and permeation characteristics of a DD3R zeolite membrane*, J. Membr. Sci., 2008, 316, pp. 35-45.

Wen, K., et al., *Permeation of single gases and gas mixtures through faujasite-type molecular sieve membrances*, Micropor. Mesopor. Mater., 2002, 54, pp. 27-36.

Xomeritakis, George, et al., *Transport properties of alumina-supported MFI membranes made by secondary (seeded) growth*, Micropor. Mesopor. Mater., 2000, 38, pp. 61-73.

Yan, Yushan, et al., *Preparation of highly selective zeolite ZSM-5 membranes by a post-synthetic coking treatment*, J. Membr. Sci., 1997, 123(1), pp. 95-103.

Yang, Lisha and Huimin Lu, *Microwave-assisted ionothermal synthesis and characterization of zeolitic imidazolate framework-8*, Chinese J. Chem., 2012, 30, pp. 1040-1044.

Yoo, Won Cheol, et al., *High-performance randomly oriented zeolite membranes using brittle seeds and rapid thermal processing*, Angew. Chem. Int. Ed., 2010, 49, pp. 8699-8703.

Zhang, Yanfeng, et al., *Blocking defects in SAPO-34 membranes with cyclodextrin*, J. Membr. Sci., 2010, 358, pp. 7-12

Zheng, Zhenkun, et al., *Synthesis, characterization and modification of DDR membranes grown on alpha-alumina supports*, J. Mater. Sci., 2008, 43, pp. 2499-2502.

International Search Report issued Oct. 18, 2013 for PCT/US2013/042075.

Nov. 20, 2013 Notice of Allowability mailed for U.S. Appl. No. 13/399,645, filed Feb. 17, 2012.

Aguado, Sonia, et al., *Facile synthesis of an ultramicroporous MOF tubular membrane with selectivity towards $CO_2$*. New J. Chem. 2011, 35, p. 41-44.

Bae, Tae-Hyun, et al., *A High-performance gas-separation membrane containing submicrometer-sized metal-organic framework crystals*, Angew. Chem. Int. Edit. 2010, 49, 2010, pp. 9863-9866.

Brar, Tejinder, et al., *Control of crystal size and distribution of zeolite A*. Ind. Eng. Chem. Res. 2001, 40, pp. 1133-1139.

Bux, Helge, et al., *Oriented zeolitic imidazolate framework-8 membrane with sharp $H_2/C_3H_8$ Molecular Sieve Separation*. Chem. Mater. 2011, 23, pp. 2262-2269.

Bux, Helge, et al., *Zeolitic imidazolate framework membrane with molecular sieving properties by microwave-assisted solvothermal synthesis*. J. Am. Chem. Soc. 2009, 131(44), pp. 16000-16001.

Centrone, A., et al., *Growth of metal-organic frameworks on polymer surfaces*. J. Am. Chem. Soc. 2010, 132(44), pp. 15687-15691.

Chen, Banglin, et al. *A microporous metal-organic framework for gas-chromatographic separation of alkanes*. Agnew. Chem. Int. Ed. 2006, 45, pp. 1390-1393.

Den Exter, M.J. et al. *Separation of permanent gases on the all-silica 8-ring clathrasil DD3R*. (Weitkamp, J., et al, eds. *Zeolites and related microporous materials: state of the art 1994*). Studies in Surface and Catalysis, 1994, 84, pp. 1159-1166.

Forster, Paul M., et al. *A High-throughput investigation of the role of pH, temperature, concentration, and time on the synthesis of hybrid inorganic-organic materials*. Angew. Chem. Ed. 2005, 44, pp. 7608-7611.

Gascon, Jorge, et al., *Accelerated synthesis of all-silica DD3R and its performance in the separation of propylene/propane mixtures*. Microporous and Mesoporous Materials, 2008, 115(3), pp. 585-593.

Ge, Qinqin, et al., *High-performance zeolite NaA membranes on polymer-zeolite composite hollow fiber supports*. J. Am. Chem. Soc. 2009, 131(47), pp. 17056-17057.

Gies, H., *Studies on clathrasils. IX Crystal structure of decadodecasil 3R, the missing link between zeolites and clathrasils*. Zeitschrift für Kristallographie, 1986, 175, pp. 93-104.

Haque, Enamul, et al. *Synthesis of a metal-organic framework material, iron terephthalate, by ultrasound, microwave, and conventional electric heating: a kinetic study*. Chem. Eur. J. 2010, 16, pp. 1046-1052.

Himeno, Shuji, et al., *Characterization and selectivity for methane and carbon dioxide adsorption on the all-silica DD3R zeolite*. Microporous and Mesoporous Materials, 2007, 98, pp. 62-69.

Huang, Aisheng, and Jürgen Caro. *Covalent post-functionalization of zeolitic imidazolate framework ZIF-90 membrane for enhanced hydrogen selectivity*. Angew. Chem. Int. Ed. 2011, 50, pp. 4979-4982.

Huang, Aisheng, et al., *Molecular sieve membrane with hydrogen permselectivity: ZIF-22 in LTA topology prepared with 3-aminopropyltriethoxysilane as covalent linker*. Angew. Chem. Int. Edit. 2010, 49, pp. 4958-4961.

Huang, Aisheng, et al., *Steam-stable zeolitic imidazolate framework ZIF-90 membrane with hydrogen selectivity through covalent functionalization*. J. Am. Chem. Soc. 2010, 132(44), pp. 15562-15564.

Jang, Kwang-Suk, et al., *Modified mesoporous silica gas separation membranes on polymeric hollow fibers*. Chem. Mater. 2011, 23, pp. 3025-3028.

Lee, Clare, et al., *Thermodynamic and kinetic factors in the hydrothermal synthesis of hybrid frameworks: zinc 4-cyclohexene-1,2-dicarboylates*. Chem. Commun. 2006, pp. 2687-2689.

(56) References Cited

OTHER PUBLICATIONS

Li, Yan-Shuo, et al., *Molecular sieve membrane: supported metal-organic framework with high hydrogen selectivity*. Angew. Chem. Int. Edit. 2010, 49, pp. 548-551.

Li, Zong-Qun, et al. *Ultrasonic synthesis of the microporous metal-organic framework Cu3(BTC)2 at ambient temperature and pressure: an efficient and environmentally friendly method*. Mater. Lett. 2009, 63, pp. 78-80.

Lin, Zhoujia, et al., *Chiral induction in the ionothermal synthesis of a 3-D coordination polymer*. Am. Chem. Soc. 2007, 129(16), pp. 4880-4881.

Liu, Xin-Lei, et al., *An organophilic pervaporation membrane derived from metal-organic framework nanoparticles for efficient recovery of bio-alcohols*. Angew. Chem. Int. Ed. 2011, 50, pp. 10636-10639.

Liu, Yunyang, et al., *Synthesis and characterization of ZIF-69 membranes and separation for $CO_2/CO$ mixture*. J. Membr. Sci. 2010, 353, p. 36-40.

Liu, Yunyang, et al., *Synthesis of highly c-oriented ZIF-69 membranes by secondary growth and their gas permeation properties*. J. Membr. Sci. 2011, 379, pp. 46-51.

Ma, Bao-Qing, et al., *Microporous pillared paddle-wheel frameworks based on mixed-ligand coordination of zinc ions*. Inorganic Chemistry 2005, 44(14), pp. 4912-4914.

McCarthy, Michael C., et al., *Synthesis of zeolitic imidazolate framework films and membranes with controlled microstructures*. Langmuir 2010, 26(18), pp. 14636-14641.

Pachfule, Pradip, et al., *Solvothermal synthesis, structure, and properties of metal organic framework isomers derived from a partially fluorinated link*. Cryst. Growth Des. 2011, 11(4), pp. 1215-1222.

Pan, Long, et al., *Microporous metal organic materials: promising candidates as sorbents for hydrogen storage*. J. Am. Chem. Soc. 2004(5), 126, pp. 1308-1309.

Pan, Yichang & Zhiping Lai, *Sharp separation of $C_2/C_3$ hydrocarbon mixtures by zeolitic imidazolate framework-8 (ZIF-8) membranes synthesized in aqueous solutions*. Chem. Commun. 2011, 47, pp. 10275-10277.

Qiu, Wulin, et al., *Dehydration of ethanol-water mixtures using asymmetric hollow fiber membranes from commercial polyimides*. J. Membr. Sci. 2009, 327, pp. 96-103.

Ranjan, Rajiv and Michael Tsapatsis, *Microporous metal organic framework membrane on porous support using the seeded growth method*. Chem. Mater. 2009, xxx(xx), 000-000.

Tomita, Toshihiro, et al., *Gas separation characteristics of DDR type zeolite membrane*. Microporous and Mesoporous Materials. 2004, 68, pp. 71-75.

Venna, Surendar R. and Moises A. Carreon, *Highly permeable zeolite imidazolate framework-8 membranes for $CO_2/CH_4$ separation*, J. Am. Chem. Soc. 2010, 132(1), pp. 76-78.

Watanabe, Taku, et al., *Computational identification of a metal organic framework for high selectivity membrane-based $CO_2/CH_4$ separations: $Cu(hfipbb)(H_2hfipbb)_{0.5}$*. Phys. Chem. Chem. Phys. 2009, 11, pp. 11389-11394.

Xu, Gengsheng, et al., *Preparation of ZIF-8 membranes supported on ceramic hollow fibers from a concentrated synthesis gel*. J. Membr. Sci. 2011, 385-386, pp. 187-193.

Yaghi, Omar M., et al., *Reticular synthesis and the design of new materials*. Nature, Jun. 12, 2003, 423, pp. 705-714.

Yang, Qi-Liang, et al., *Synthesis of DDR-type zeolite in fluoride medium*. Chinese Journal of Inorganic Chemistry. 2009, 25(2), pp. 191-194.

Yao, Jianfeng, et al, *Contra-diffusion synthesis of ZIF-8 films on a polymer substrate*. Chem. Commun. 2011, 47, pp. 2559-2561.

International Search Report issued Feb. 23, 2012 for PCT/US2011/047769.

International Search Report issued May 25, 2012 for PCT/US2012/025080.

International Search Report issued Jul. 12, 2012 for PCT/US2012/025064.

International Search Report issued Nov. 6, 2012 for PCT/US2012/054817.

Baker, Richard W., *Future directions of membrane gas separation technology*, Ind. Eng. Chem. Res. 41(6) (2002) 1393-411.

Baker, Richard W. and Kaaeid Lokhandwala, *Natural gas processing with membranes: An overview*, Ind. Eng. Chem. Res. 47(7) (2008) 2109-21.

Caro, Jüergen and Manfred Noack, *Zeolite membranes—Recent developments and progress*, Micropor. Mesopor. Mater. 115 (2008) 215-33.

Carreon, Moises A., et al., *Alumina-supported SAPO-34 membranes for $CO_2/CH_4$ separation*, J. Am. Chem. Soc. 130(16) (2008) 5412-13.

Chiu, W. V., et al., *Post-synthesis defect abatement of inorganic membranes for gas separation*, J. Membr. Sci. 377 (2011) 182-90.

Choi, Jungkyu, et al., *Grain boundary defect elimination in a zeolite membrane by rapid thermal processing*, Science, 2009, 325, pp. 590-593.

Cui, Ying, et al., *Preparation and gas separation performance of zeolite T membrane*, J. Mater. Chem. 14(5) (2004) 924-32.

Cui, Ying, et al., *Preparation and gas separation properties of zeolite T membrane*, Chem. Comm. 17 (2003) 2154-55.

Favre, Eric, *Carbon dioxide recovery from post-combustion processes: Can gas permeation membranes compete with absorption?*, J. Membr. Sci. 294 (2007) 50-59.

Hao, Ji Hua and Shichang Wang, *Influence of quench medium on the structure and gas permeation properties of cellulose acetate membranes*, J. Appl. Polym. Sci. 68(8) (1998) 1269-76.

Heng, Samuel, et al., *Low-temperature ozone treatment for organic template removal from zeolite membrane*, J. Membr. Sci. 243 (2004) 69-78.

Himeno, Shuji, et al., *Synthesis and permeation properties of a DDR-type zeolite membrane for separation of $CO_2/CH_4$ gaseous mixtures*, Ind. Eng. Chem. Res. 46(21) (2007) 6989-97.

Huang, Aisheng and Jürgen Caro, *Cationic polymer used to capture zeolite precursor particles for the facile synthesis of oriented zeolite LTA molecular sieve membrane*, Chem. Mater. 22(15) (2010) 4353-55.

Husain, Shabbir, Mixed Matrix Dual Layer Hollow Fiber Membranes for Natural Gas Separation, Dissertation, Georgia Institute of Technology, Atlanta, GA, 2006, 48-49.

Jee, Sang Eun and David S. Sholl, *Carbon dioxide and methane transport in DDR zeolite: Insights from molecular simulations into carbon dioxide separations in small pore zeolites*, J. Am. Chem. Soc. 131(22) (2009) 7896-7904.

Jie, Xingming, et al., *Gas permeation performance of cellulose hollow fiber membranes made from the cellulose/N-methylmorpholine-N-oxide/$H_2O$ system*, J. Appl. Polym. Sci. 91(3) (2004) 1873-80.

Kanezashi, Masakoto, et al., *Gas permeation through DDR-type zeolite membranes at high temperatures*, AIChE J. 54(6) (2008) 1478-86.

Koros, William J. and Rajiv Mahajan, *Pushing the limits on possibilities for large scale gas separation: Which strategies?*, J. Membr. Sci. 175 (2000) 181-96.

Kuhn, Jelan, et al., *Detemplation of DDR type zeolites by ozonication*, Micropor. Mesopor. Mater. 120 (2009) 12-18.

Kumar, P. et al., *Ordered mesoporous membranes: Effects of support and surfactant removal conditions on membrane quality*, J. Membr. Sci. 279 (2006) 539-47.

Kusakabe, Katsuki, et al., *Formation of a Y-type zeolite membrane on a porous alpha-alumina tube for gas separation*, Ind. Eng. Chem. Res. 36(3) (1997) 649-55.

Li, Shiguang, et al., *Scale-up of SAPO-34 membranes for $CO_2/CH_4$ separation*, J. Membr. Sci. 352 (2010) 7-13.

Li, Zong-Qun, et al., *Fabrication of nanosheets of a fluorescent metal-organic framework $[Zn(BDC)(H_2O)]_n$ (BDC = 1,4-benzenedicarboxylate): Ultrasonic synthesis and sensing of ethylamine*, Inorganic Chemistry Communications 11(11) (2008) 1375-77.

Lindmark, Jonas and Jonas Hedlund, *Modification of MFI membranes with amine groups for enhanced $CO_2$ selectivity*, J. Mater. Chem. 20(11) (2010) 2219-25.

(56) References Cited

OTHER PUBLICATIONS

Matsuda, H., et al., *Improvement of ethanol selectivity of silicalite membrane in pervaporation by silicone rubber coating*, J. Membr. Sci. 210(2) (2002) 433-37.

Morris, William, et al., *Crystals as molecules: Postsynthesis covalent functionalization of zeolitic imidazolate frameworks*, J. Am. Chem. Soc. 130(38) (2008) 12626-27.

Nair, Sankar, et al., *Separation of close boiling hydrocarbon mixtures by MFI and FAU membranes made by secondary growth*, Micropor. Mesopor. Mater. 48 (2001) 219-28.

Parikh, Atul N., et al., *Non-thermal calcination by ultraviolet irradiation in the synthesis of microporous materials*, Micropor. Mesopor. Mater. 76 (2004) 17-22.

Sommer, Stefan and Thomas Melin, *Influence of operation parameters on the separation of mixtures by pervaporation and vapor permeation with inorganic membranes. Part 1: Dehydration of solvents*, Chem. Eng. Sci. 60 (2005) 4509-23.

Son, Won-Jin, et al., *Sonochemical synthseis of MOF-5*, Chem. Commun. 47 (2008) 6336-38.

Van Den Bergh, Johan, et al., *Modeling permeation of $CO_2/CH_4$, $N_2/CH_4$, and $CO_2$/air mixtures across a DD3R zeolite membrane*, J. Phys. Chem. C 114(20) (2010) 9379-89.

Van Den Bergh, J., et al., *Separation and permeation characteristics of a DD3R zeolite membrane*, J. Membr. Sci. 316 (2008) 35-45.

Weh, K., et al., *Permeation of single gases and gas mixtures through faujasite-type molecular sieve membrances*, Micropor. Mesopor. Mater. 54 (2002) 27-36.

Xomeritakis, George, et al., *Transport properties of alumina-supported MFI membranes made by secondary (seeded) growth*, Micropor. Mesopor. Mater. 38 (2000) 61-73.

Yan, Yushan, et al., *Preparation of highly selective zeolite ZSM-5 membranes by a post-synthetic coking treatment*, J. Membr. Sci. 123(1) (1997) 95-103.

Yang, Lisha and Huimin Lu, *Microwave-assisted ionothermal synthesis and characterization of zeolitic imidazolate framework-8*, Chinese J. Chem. 30 (2012) 1040-44.

Yoo, Won Cheol, et al., *High-performance randomly oriented zeolite membranes using brittle seeds and rapid thermal processing*, Angew. Chem. Int. Ed. 49 (2010) 8699-703.

Zhang, Yanfeng, et al., *Blocking defects in SAPO-34 membranes with cyclodextrin*, J. Membr. Sci. 358 (2010) 7-12.

Zheng, Zhenkun, et al., *Synthesis, characterization and modification of DDR membranes grown on alpha-alumina supports*, J. Mater. Sci. 43 (2008) 2499-502.

PCT Oct. 18, 2013 International Search Report and Written Opinion issued for International Patent Application No. PCT/US2013/042075.

Mar. 5, 2013 Office Action mailed for U.S. Appl. No. 13/611,988, filed Sep. 12, 2012.

Jun. 5, 2013 Response to Office Action mailed Mar. 5, 2013 for U.S. Appl. No. 13/611,988, filed Sep. 12, 2012.

Jun. 10, 2013 Office Action/Noncompliant Amendment mailed for U.S. Appl. No. 13/611,988, filed Sep. 12, 2012.

Jun. 14, 2013 Response to Office Action/Noncompliant Amendment mailed Jun. 10, 2013 for U.S. Appl. No. 13/611,988, filed Sep. 12, 2012.

Sep. 5, 2013 Office Action mailed for U.S. Appl. No. 13/611,988, filed Sep. 12, 2012.

Nov. 5, 2013 Response to Final Office Action mailed Sep. 5, 2013 for U.S. Appl. No. 13/611,988, filed Sep. 12, 2012.

Nov. 18, 2013 Notice of Allowability mailed for U.S. Appl. No. 13/611,988, filed Apr. 4, 2011.

Nov. 20, 2012 Notice of Allowability mailed for U.S. Appl. No. 13/399,645, filed Feb. 17, 2012.

Marler, et al., *Studies on clathrasils VIII. Nonasils-[$4^1$ $5^8$], $88SiO_2*8M^9*4M^{20}$: Synthesis, thermal properties, and crystal structure*, J. Inclusion Phenomena 4(4) (1986) 339-349.

Ameloot, et al., *Interfacial synthesis of hollow metal-organic framework capsules demonstrating selective permeability*, Nature Chemistry 3 (May 2011) 382-387.

Brown, et al., *Continuous polycrystalline zeolitic imidazolate framework-90 membranes on polymeric hollow fibers*, Angew. Chem. 124 (2012) 10767-10770.

Buonomenna, *Membrane processes for a sustainable industrial growth*, RSC Adv. 3 (2013) 5694-5740.

Bux, et al., *Oriented zeolitic imidazolate framework-8 membrane with sharp $H_2/C_3H_8$ molecular sieve separation*, Chem. Mater. 23 (2011) 2262-2269.

Cao, et al., *Growth of uniformly oriented silica MFI and BEA zeolite films on substrates*, Science 334 (Dec. 16, 2001) 1533-1538.

Choi, et al., *Grain boundary defect elimination in a zeolite membrane by rapid thermal processing*, Science 325 (Jul. 31, 2009) 590-593.

Gascon, et al., *Accelerated synthesis of all-silica DD3R and its performance in the separation of propylene/propane mixtures*, Microporous & Mesoporous Materials 115 (2008) 585-593.

Gascon, et al., *Practical approach to zeolitic membranes and coatings: State of the art, opportunities, barriers, and future perspectives*, Chem. Mater. 24 (2012) 2829-2844.

Huang, et al., *Steam-stable zeolitic imidazolate framework ZIF-90 membrane with hydrogen selectivity through covalent functionalization*, J. Am. Chem. Soc. 132(44) (2010) 15562-15564.

Jang, et al., *Modified mesoporous silica gas separation membranes on polymeric hollow fibers*, Chem. Mater. 23 (2011) 3025-3028.

Kwon, et al., *Highly propylene-selective supported zeolite-imidazolate framework (ZIF-8) membranes synthesized by rapid microwave-assisted seeding and secondary growth*, Chem. Commun. 49 (2013) 3854-3856.

Li, et al., *Zeolitic imidazolate frameworks for kinetic separation of propane and propene*, J. Am. Chem. Soc. 131(30) (2009) 10368-10369.

Pan, et al., *Effective separation of propylene/propane binary mixtures by ZIF-8 membranes*, J. Membrane Science 390-391 (2012) 93-98.

Pan, et al., *Sharp separation of $C_2/C_3$ hydrocarbon mixtures by zeolitic imidazolate framework-8 (ZIF-8) membranes synthesized in aqueous solutions*, Chem. Commun. 47(37) (Oct. 7, 2011) 10275-10277.

Pan, et al., *Synthesis of ceramic hollow fiber supported zeolitic imidazolate framework-8 (ZIF-8) membranes with high hydrogen permeability*, J. Membrane Science 421-422 (2012) 292-298.

Park, et al., *Exceptional chemical and thermal stability of zeolitic imidazolate frameworks*, PNAS 103(27) (Jul. 5, 2006) 10186-10191.

Pera-Titus, et al., *Preparation of inner-side tubular zeolite NaA membranes in a semi-continuous synthesis system*, J. Membrane Science 278 (2006) 401-409.

Shah, et al., *Current status of metal-organic framework membranes for gas separations: Promises and challenges*, Ind. Eng. Chem. Res. 51 (2012) 2179-2199.

Thompson, et al., *Hybrid zeolitic imidazolate frameworks: Controlling framework porosity and functionality by mixed-linker synthesis*, Chem. Mater. 24 (2012) 1930-1936.

Tsapatsis, *Toward high-throughput zeolite membranes*, Science 334 (Nov. 11, 2011) 767-768.

Varoon, et al., *Dispersible exfoliated zeolite nanosheets and their application as a selective membrane*, Science 334 (Oct. 7, 2011) 72-75.

PCT Aug. 22, 2014 International Search Report and Written Opinion issued in International Application PCT/US14/133169.

Aug. 3, 2012 Office Action/Non-Final Rejection mailed in U.S. Appl. No. 12/971,132, filed Dec. 17, 2010.

Dec. 18 2012 Response to Office Action mailed Aug. 3, 2012 filed in U.S. Appl. No. 12/971,132, filed Dec. 17, 2010.

Jan. 28, 2013 Office Action/Final Rejection mailed in U.S. Appl. No. 12/971,132, filed Dec. 17, 2010.

Jun. 24, 2010 Response to Final Office Action mailed Jan. 28, 2013 with Declaration filed in U.S. Appl. No. 12/971,132, filed Dec. 17, 2010.

Aug. 14, 2013 Office Action/Non Final Rejection mailed in U.S. Appl. No. 12/971,132, filed Dec. 17, 2010.

Feb. 11, 2014 Response to Office Action mailed Aug. 14, 2013 with Declaration filed in U.S. Appl. No. 12/971,132, filed Dec. 17, 2010

Mar. 3, 2014 Notice of Allowance/Allowability with Examiner's Amendment and Statement of Reasons for Allowance mailed in U.S. Appl. No. 12/971,132, filed Dec. 17, 2010.

(56) References Cited

OTHER PUBLICATIONS

Oct. 31, 2013 Office Action/Non-Final Rejection mailed in U.S. Appl. No. 13/396,411, filed Feb. 14, 2012.
Jan. 17, 2014 Response to Office Action mailed Oct. 31, 2013 filed in U.S. Appl. No. 13/396,411, filed Feb. 14, 2012.
Apr. 9, 2014 Final Office Action mailed in U.S. Appl. No. 13/396,411, filed Feb. 14, 2012.
Jun. 3, 2014 Response to Final Office Action filed in U.S. Appl. No. 13/396,411, filed Feb. 14, 2012.
Jun. 11, 2014 Notice of Allowance/Allowability with Examiner's Amendment/Comment mailed in U.S. Appl. No. 13/396,411, filed Feb. 14, 2012.
Dec. 19, 2013 Notice of Allowance/Allowability with Examiner's Amendment/Comment mailed in U.S. Appl. No. 13/399,645, filed Feb. 17, 2012.
Apr. 19, 2013 Office Action Non-Final mailed in U.S. Appl. No. 13/209,957, filed Aug. 15, 2011.
Jun. 14, 2013 Response to Office Action Mailed Apr. 19, 2013 in U.S. Appl. No. 13/209,957, filed Aug. 15, 2011.
Jul. 11, 2013 Notice of Allowance / Allowability mailed in U.S. Appl. No. 13/209,957, filed Aug. 15, 2011.
Gordillo, et al., *Site percolation in zeolitic frameworks*, Zeolites 15 (1995) 656-659.
Moloy, et al., *High-silica zeolites: A relationship between energetics and internal surface areas*, Microporous & Mesoporous Materials 54 (2002) 1-13.
Nair, *Nanoscopic metal oxide objects via controlled creation and rearrangement of amorphous nanoparticles*, presented Dec. 11, 2007, School of Chemical & Biomolecular Engineering Georgia Institute of Technology, Atlanta, GA 30332-0100.
Skoulidas, et al., *Self-diffusion and transport diffusion of light gases in metal-organic framework materials assessed using molecular dynamics simulations*, J. Phys. Chem. B 109 (2005) 15760-15768.
Chen, et al., *Interwoven metal-organic framework on a periodic minimal surface with extra-large pores*, Science 291 (2001) 1021-1023.
Eddaoudi, et al., *Design and synthesis of metal-carboxylate frameworks with permanent microporosity*, Topics in Catalysis 9 (1999) 105-111.
Foster, et al., *A geometric solution to the largest free-sphere problem in zeolite frameworks*, Microporous & Mesoporous Materials 90(1-3) (2006) 32-38.
Hoshen, et al., *Percolation and cluster distribution. I. Cluster multiple labeling technique and critical concentration algorithm*, Physical Review B 14(8) (1976) 3438.
Keskin, et al., *Efficient methods for screening of metal organic framework membranes/or gas separations using atomically detailed models*, Langmuir 25(19) (2009) 11786-11795.
Li, et al., *Design and synthesis of an exceptionally stable and highly porous metal-organic framework*, Nature 402 (1999) 276-279.

Ockwig, et al., *Reticular chemistry: Occurrence and taxonomy nets and grammar for the design of frameworks*, Acc. Chem. Res. 38(3) (2005) 176-182.
Seki, *Dynamic channels of a porous coordination polymer responding to external stimuli*, Phys. Chem. Chem. Phys. 4(10) (2002) 1968-1971.
Yaghi, et al., *Reticular synthesis and the design of new materials*, Nature 423 (2003) 705-714.
PCT Feb. 24, 2011 International Search Report and Written Opinion mailed in International Patent Application PCT/US2010/060945.
CN Mar. 14, 2014 Notification of the First Office Action mailed in Chinese Patent Application 201080057358.8 (with English Translation).
CN Jul. 28, 2014 Response to First Office Action mailed on Mar. 14, 2014 filed in Chinese Patent Application 201080057358.8 (with English Translation).
CN Sep. 16, 2014 Notification of the Second Office Action mailed in Chinese Patent Application 201080057358.8 (with English Translation).
JP Nov. 26, 2013 Office Action mailed in Japanese Patent Application 2012-543346 (with English Translation).
JP Jun. 17, 2014 Examiner's Decision of Refusal mailed in Japanese Patent Application 2012-543346 (with English Translation).
KR Feb. 10, 2014 Notice of Submission of Opinion/Office Action mailed in Korean Patent Application 10-2012-7013862 (with English Translation).
Aksay, et al., *Biometric pathways for assembling inorganic thin films*, Science 273(5277) (1996) 892-898.
Miyata, et al., *Silica films with a single-crystalline mesoporous structure*, Nat. Mater. 3(9) (2004) 651-656.
Yang, et al., *Registered growth of mesoporous silica films on graphite*, J. Mater. Chem. 7(7) (1997) 1285-1290.
PCT Feb. 23, 2012 International Search Report and Written Opinion issued in International Patent Application PCT/US11/47769.
CN Mar. 9, 2015 Response to Office Action (with English translation of claims) filed in China Patent Application No. 201180052181.7.
JP Apr. 7, 2015 Office Action mailed in Japan Patent Application No. 2013-536619 (with English translation).
JP Apr. 24, 2015 English translation of Description and Claims for JP Patent Application Laid-Open No. 2002-338229.
JP Apr. 24, 2015 English translation of Description and Claims for JP Patent Application Laid-Open No. 2008-173576.
CN Dec. 2, 2014 Response to Office Action filed in China Patent Application No. 201080057358.8.
CN Mar. 16, 2015 Third Office Action mailed in China Patent Application No. 201080057358.8.
PCT Jul. 27, 2012 International Search Report and Written Opinion issued in International Patent Application No. PCT/US2012/025064.
PCT May 25, 2012 International Search Report and Written Opinion issued in International Patent Application No. PCT/US2012/025080.
JP Dec. 15, 2015 Office Action mailed in Japan Patent Application No. 2013-536619 (with English translation).

* cited by examiner

Table 1: Reported gas permeation characteristics of ZIF membranes grown on $TiO_2$ or $\alpha-Al_2O_3$ disks or tubes and comparison to summary data from ZIF-90/Torlon membranes in this work

| Ref # | ZIF | Temp. (°C) | $CO_2$ Permeability (Barrer) | Selectivities | | |
|---|---|---|---|---|---|---|
| | | | | $CO_2/CH_4$ | $H_2/CO_2$ | $CO_2/N_2$ |
| Bux 2009 | ZIF-8 | 25 | 1390 | 2.8 | 4.5 | 2.6 |
| McCarthy | ZIF-8 | 25 | 2658 | 3.3 | 3.9 | 3 |
| Venna | ZIF-8 | 22 | 327060 | 4.7 | - | - |
| Bux 2011 | ZIF-8 | 25 | 540 | 2.5 | 6.7 | - |
| Xu | ZIF-8 | 25 | 305 | 0.1 | 32.2 | 0.1 |
| Pan | ZIF-8 | 25 | 1100 | 1.8 | 2.7 | 1.7 |
| Li | ZIF-7 | 200 | 49 | 0.9 | 6.7 | 1 |
| Huang 2010B | ZIF-22 | 50 | 2840 | 0.8 | 8.5 | 0.8 |
| Liu 2010 | ZIF-69 | 25 | 3730 | 1.7 | 2.6 | - |
| Liu 2011 | ZIF-69 | 25 | 2820 | 2.7 | - | 2.2 |
| Aguado | SIM-1 | 30 | 2710 | 1.1 | 2.3 | 1.1 |
| Huang 2010A | ZIF-90 | 200 | 2079 | 2.2 | 7.2 | 1.8 |
| Huang 2011 | ZIF-90 Imine | 200 | 800 | 1.2 | 15.7 | 1 |
| This work | ZIF-90 Torlon | 35 | 1587 | 1.5 | 1.8 | 3.5 |

FIG. 5

METAL-ORGANIC FRAMEWORK SUPPORTED ON POROUS POLYMER

PRIOR RELATED APPLICATIONS

This application claims the benefit of U.S. Provisional Application Ser. No. 61/651,593 for "Metal-Organic Framework Supported on Porous Polymer," filed on May 25, 2012.

FEDERALLY SPONSORED RESEARCH STATEMENT

Not Applicable ("N/A")

REFERENCE TO MICROFICHE APPENDIX

N/A

FIELD OF INVENTION

The invention relates to continuous Metal Organic Framework (MOF) membranes made on porous polymeric supports, and methods of making or using same.

BACKGROUND OF THE INVENTION

Metal Organic Frameworks (MOFs) are crystalline compounds consisting of metal ions or clusters coordinated to often rigid organic molecules to form one-, two-, or three-dimensional structures that can be porous. In some cases, guest molecules can stably enter the pores, thus MOF crystals can be used for the storage of gases such as hydrogen and carbon dioxide. Further, since some guest molecules can enter more easily than others, and the pores can be functionalized to change their chemical properties, this can be used as the basis for separation methodologies. For example, MOFs can be used to make a highly selective and permeable membrane to separate small gas molecules (e.g., $CO_2$ from $CH_4$) or liquid molecules (e.g., hydrocarbons, alcohols, water). Additional applications of MOFs are in catalysis, in drug delivery, and as sensors.

Describing and organizing the complex structures of the large number of available MOFs could be a difficult and confusing task without a logical, unambiguous set of classifications. Indeed, the literature is replete with inconsistent use of terminology and a plethora of abbreviations. Recently, a system of nomenclature has been developed to fill this terminology need. The inorganic sections of a MOF, or secondary building units (SBUs), can be described by topologies common to several structures. Each topology, also called a net, is assigned a symbol, consisting of three lower-case letters in bold. MOF-5, for example, has a pcu net. The database of net structures can be found at the Reticular Chemistry Structure Resource (rcsr.anu.edu.au). Further, the International Union of Pure and Applied Chemistry (IUPAC) is working on suitable terminology that can gain a broad acceptance, while at the same time not deviating too much from the most commonly used nomenclature.

Zeolitic imidazolate frameworks (ZIF) are a subset of metal-organic frameworks. The term "zeolite" was originally coined in 1756 by Swedish mineralogist Axel Fredrik Cronstedt, who observed that upon rapidly heating the mineral "stilbite," it produced large amounts of steam from water that had previously been adsorbed into the material. Based on this, he called the material zeolite, from the Greek zeo, meaning "boil" and lithos, meaning "stone."

We now know that zeolites are microporous, aluminosilicate or silicate minerals, and are considered a subtype of MOF crystals. As of November 2010, 194 unique zeolite frameworks were identified, and over 40 naturally occurring zeolite frameworks are known. Some of the more common mineral zeolites are analcime, chabazite, clinoptilolite, heulandite, natrolite, phillipsite, and stilbite.

Zeolites have a porous structure that can accommodate a wide variety of cations, such as Na+, K+, $Ca^{2+}$, $Mg^{2+}$ and many others. These positive ions are rather loosely held and can readily be exchanged for others in a contact solution or gas. The regular pore structure and the ability to vary pore size, shape and chemical nature makes zeolites very useful as molecular sieves.

Depending on their structure and composition, zeolites can separate molecules based on adsorption and/or diffusion of certain molecules preferentially inside the pores or exclusion of certain molecules based on their size. The pore size is typically less than 2 nm and comparable to that of small molecules, allowing the use of zeolites to separate lightweight gases such as $CO_2$ and $CH_4$. For example, one liter of ZIF crystals can store about 83 liters of $CO_2$. ZIF crystals are also non-toxic and require little energy to create, making them an attractive possibility for carbon capture and storage. Further, the porous ZIF structures can be heated to high temperatures without decomposing and can be boiled in water or solvents for a week and remain stable, making them suitable for use in hot, energy-producing environments like power plants.

The liquid separation properties of MOF membranes are also attracting increased attention, and are of high interest in a number of emerging applications (e.g., separation of higher hydrocarbons, organics/water separations). Recently, it was reported that polymer/MOF mixed matrix membranes containing ZIF-8 exhibited high selectivity for alcohols over water.

Zeolitic imidazolate framework-90 or "ZIF-90" is one example of an attractive MOF for application in selective membranes. ZIF-90 has a sodalite cage structure with ~0.35 nm pore windows, through which size exclusion of molecules is possible. Furthermore, the imidazole linker in ZIF-90 contains a carbonyl group, which can have a favorable chemical noncovalent interaction with polar molecules. The structure of ZIF-90 in the [111] direction is shown in FIG. 6A; and the structure of a single unit cell of ZIF-90, showing the one-dimensional channels available for molecular adsorption and diffusion is shown in FIG. 6B.

Zeolitic molecular sieving membranes with very high throughput and high selectivity can be fabricated by hydrothermal processing on flat and tubular ceramic supports.

In making ZIF membranes on aluminum, steel, glass or ceramic supports, a seed layer is deposited and then crystals grown on the seed layer. Various methods have been used to obtain a uniform thin seed layer, include dip-coating, evaporative deposition, rubbing techniques, and waxing techniques. Efforts are also made to control the orientation of the seed layer and the quality of the substrate, and thus the properties of the final membrane.

The experience gained in the preparation of MFI and other zeolitic membranes has shown that, in addition to gross defects in the membrane layer, such as pin holes and cracks, there are many factors critical for the performance of the composite membranes. Some of them are (i) the adhesion of the zeolite layer on the support surface, (ii) the difference of the thermal expansion coefficients of support and zeolite, (iii) the orientation of zeolite crystals, (iv) the thickness of the zeolite layer, (v) the anisotropy of mass transport due to an anisotropic pore geometry, and (vi) the influence of crystal boundaries on the permeation properties.

However, current membranes currently have limited application due to the high cost of the support materials and the difficulties encountered in the scale-up and reliability of hydrothermal growth and subsequent processing steps such as high-temperature calcination to remove the organic structure-directing agents.

Thus, the scalable fabrication of MOF membranes remains a key issue, and a departure from the paradigm of membrane growth on ceramic, aluminum, glass and steel substrates is still needed.

An alternative route to high-performance MOF membranes is to grow them on porous polymer supports, particularly hollow fibers. Macroporous (~100 nm pore size) polymer hollow fibers can be easily manufactured at low cost, for example, from polyamide-imide polymer (e.g., TORLON®). These fibers can be bundled together to produce low cost hollow-fiber modules with 1000-10,000 $m^2$ of membrane surface area/$m^3$ of module volume. In order to obtain molecular selectivity, it is necessary to find methods to grow continuous MOF membranes on the surfaces of these hollow fibers. These methods must use sufficiently low temperatures and appropriate reagents and solvents so as to not degrade or destroy the polymeric supports.

Little is known regarding the growth of ZIF materials on polymeric surfaces, although our own work suggests that small, uniform seed crystals are desirable for coating on the surface prior to membrane growth (see e.g., U.S. patent application Ser. No. 13/399,645, filed Feb. 17, 2012, and U.S. patent application Ser. No. 13/396,411, filed Feb. 14, 2012).

The techniques used for inorganic supports are not easily transferable to polymeric supports, because of issues of material compatibility, poor adhesion at the polymer-ZIF interface, the highly curved nature of the hollow fiber surface and because the polymer may be unstable at the conditions required for membrane growth. The ZIF often does not bind well to the polymer, creating surface defects that contribute to poor selectivity, and prevent the realization of useful membranes. Incorrect processing conditions may also cause dissolution or collapse of the porous polymer. Further, many of the solvents used are harmful for the polymer.

To solve these problems, some have tried modifying the surface of the zeolite particles or modifying the surface of the polymeric support. Organosilanes, sizing agents, for example, polyetherimide (e.g., Ultem™ (SABIC™), and surface treatments (e.g., Grignard reagent) have been used and have shown some improvement in providing membranes with increased selectivity. The Grignard treatment, for example, involves growing $Mg(OH)_2$ whiskers on the surface, and was originally developed using an aluminosilicate such as zeolite 4A, although it has been extended to MFI by the Nair group at Georgia Tech Research Corp.

Others have tried using dense films made by solution casting. However, such dense films are very slow, and to maximize flux, thinner films are better.

Other alternatives are to create a mixed ZIF/polymer support matrix. See Ge, et al. (2009), for example, which describes making composite hollow fibers by blending zeolite crystals into the polymer feed before the hollow fiber extrusion. See also Bae, et al. (2010). The embedded zeolite crystals catalyst as seeds for the resulting zeolite membrane growth, and they also "anchor" the zeolite membrane to the support to increase the adhesion of the zeolite membrane. However, this method is not cost effective, and not readily scaled up.

Thus, despite intensive research efforts, there remains a need in the art for a scalable, cost-effective method for preparing high-quality ZIF membranes on porous polymeric supports that are technologically scalable. The ideal method would also have general applicability to other MOFs and be useful for a variety of polymers.

SUMMARY OF THE INVENTION

Generally speaking, we have discovered two methods that pave the way for cost effective, large-scale manufacture of high quality MOF membranes on porous polymeric supports. The methods include (i) a method of dip coating a porous polymer (e.g., TORLON®) hollow fiber with a uniform layer of MOF seed particles, and (ii) appropriate reaction conditions at which high quality MOF membranes can be prepared on the hollow fibers while retaining the mechanical and chemical integrity of the hollow fiber.

The MOF membrane exemplified herein is a ZIF-90 membrane, but we also have preliminary data suggesting that the methodology is applicable to other ZIFs, and we expect the method to be broadly applicable to a large range of MOF crystals.

The polymer exemplified herein is a polyamide-imide polymer (e.g., TORLON®); however, other commonly used porous polymers such as polyimides, polysulfones, polyetheretherketones, or cellulose acetate can be used.

The solvents used in the seeding step will vary with the MOF and the polymer being used, such as methanol, ethanol, butanol, hexane, chloroform, toluene, dimethylformamide (DMF), water, and the like. The seeding polymer should carry, but not dissolve the nanocrystals, and should penetrate the pores of the polymer. A simple wettability test can confirm that the solvent penetrates the pores of the polymer, and a simple solubility test will confirm that the seed crystals remain sufficiently intact for the use. The MOF growth solvents should be as appropriate to solubilize the precursors and allow the synthesis of the MOF, or a saturated MOF solution can be used for crystal deposition from solution. At the same time, neither solvent should be able to dissolve or degrade the polymer.

The temperature should be as close to room temperature as possible, such as less than about 100° C., for the stability of the polymeric support. Higher temperatures may degrade the polymer or the pore structure and are, preferably, avoided.

The thickness of the MOF membrane can be controlled with time, longer periods resulting in a thicker membrane at a given temperature and for a given growth solution.

The invention also includes the various MOF membranes made herein, filters that include these MOF membranes, and applications using same. We have used hollow fibers herein to exemplify the method, but any shape support can be used, including films, fibers, beads, tubes, concentrically nested tubes, stacked tubes, and the like.

Methods of separating gases and liquids are also provided herein, the methods generally comprising subjecting a mixture of gases/liquids to the membranes made herein, and separating one gas/liquid from the mixture of gases/liquids. For example, the mixture of gases can include $CO_2$ plus at least one gas selected from the group consisting of $H_2$, $N_2$, $CH_4$, $O_2$, and combinations thereof, and $CO_2$ can be separated therefrom. Other chemicals that can be separated include water, ethanol, propanol, butanol, pentane, hexane, benzene, cyclohexane, and the like. Other applications include catalysis, drug delivery, optical and electronic applications, and sensing applications.

In more detail, in one embodiment the method of preparing MOF-membrane-polymer comprises dip coating a porous polymer with a seed solution comprising MOF nanocrystals of average size <1 micron suspended in a first solvent that can penetrate the porous polymer; drying the dip coated porous polymer; and growing larger MOF crystals on the dip coated porous polymer at less than about 100° C. in a growth solution to make a MOF-membrane-polymer, the growth solution comprising MOF precursors solubilized in a second solvent; and rinsing and drying the MOF-membrane-polymer.

The porous polymer can be in the shape of a film, a fiber, a hollow fiber, tubes, nested hollow tubes, a honeycomb stack of tubes, or any shape generally desired and useful for its ultimate purposes.

The first solvent and the second solvent are independently selected from the group consisting of water, methanol, ethanol, propanol, butanol, chloroform, toluene, hexane, DMF, and combinations thereof, provided however, that the solvents do not solubilize or destabilize the porous polymer.

The MOF can be any MOF, but in some embodiments a ZIF is preferred, such as ZIF 1-12, ZIF 80, ZIF 90 and the like, and each of the first solvent and the second solvent is an alcohol independently selected from the group consisting of water, methanol, ethanol, propanol, butanol, and combinations thereof, provided however, that the solvents do not solubilize or destabilize the porous polymer.

In one preferred method, the seed solution comprises 0.1-1% ZIF nanocrystals in methanol or ethanol, preferably, about 0.4% ZIF nanocrystals in methanol or ethanol. Preferably, the MOF seeding nanocrystals are of average size 200-600 nm, or 400-500 nm.

The growth solution will vary according to the MOF or ZIF used, but, in a ZIF, the growth solution can be 0.1-10% or 0.5-1.0% of ligand and 0.1-10% 0.5-1.0% zinc in methanol, such as imidizole carboxyaldehyde and zinc (II) nitrate. The growing step can be at about room temperature or about 50-100° C., preferably, about 60-70° C., and, most preferably, about 65° C.

The porous polymer is any suitable porous polymer, but is, preferably, selected from the group consisting of polysulfone (PS), polyethylene (PE), polyacrilonitrile (PAN), polyethersulfone (PES), polyetherimide (PEI), poly(amide-imide) (PAI), polyvinylidene difluoride (PVDF), polyvinylidene fluoride (PVDF), polydimethylsiloxane (PDMS), poly(3-octylthiophene) (POT), poly (3-(2-acetoxyethylthiophene) (PAET), polyimide, polyamide, polyetheretherketones (PEEK), and poly(vinyl acetate) (PVAc), polypropylene, cellulose acetate, 2,2-bis(3,4-carboxyphenyl) hexafluoropropane dianhydride-diaminomesitylene) (6FDA-DAM), and derivatives thereof.

In another embodiment, the invention is a method of seed coating porous polymeric supports, comprising dip coating a porous polymer with a seed solution comprising MOF nanocrystals of average size <1 micron suspended in a first solvent that can penetrate the porous polymer; and drying the dip-coated porous polymer.

In another embodiment, the invention is method of growing MOF crystals on a seeded porous polymer, comprising growing larger MOF crystals on the seeded porous polymer at less than 100° C. in a growth solution to make a MOF-membrane-polymer, the growth solution comprising MOF precursors solubilized in a second solvent; and rinsing and drying the MOF-membrane-polymer.

BRIEF DESCRIPTION OF THE DRAWINGS

For a further understanding of the nature and objects of the present invention, reference should be made to the following detailed disclosure, taken in conjunction with the accompanying drawings, in which like parts are given like reference numerals, and wherein:

FIG. 5. illustrates Table 1 comparing various prior art membranes with a ZIF-90 polyamide-imide polymer (e.g., TORLON®) membrane according to an embodiment of the present invention;

DETAILED DESCRIPTION OF EMBODIMENTS OF THE INVENTION

Figure 1A:
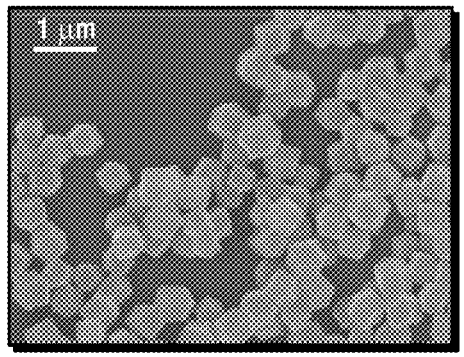
FIG. 1A illustrates a Scanning Electron Microscope (SEM) image of ZIF-90 nanocrystals according to an embodiment of the present invention.

The following detailed description of various embodiments of the present invention references the accompanying drawings, which illustrate specific embodiments in which the invention can be practiced. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains. Therefore, the scope of the present invention is defined only by the appended claims, along with the full scope of equivalents to which such claims are entitled.

Our goal in this work was to develop a cost effective and scalable approach to preparing MOF membranes for industrial use. Our test polymer was a polyamide-imide polymer. Polyamide-imide polymer is a thermoplastic amorphous polymer that has exceptional mechanical, thermal and chemical-resistant properties, produced by Solvay Advanced Polymers under the trademark TORLON®. Other high-performance polymers in this same realm are polyetheretherketone and polyimide.

Polyamide-imide polymer (e.g., TORLON®) was chosen as a suitable substrate polymer for separation applications since it is chemically resistant, withstands high pressures up to 2000 psia without plasticization, and is amenable to the engineering of hollow fibers of controlled macroporosity. Additionally, polyamide-imide polymers can be processed into a wide variety of forms—from injection or compression molded parts and ingots—to coatings, films, fibers, hollow fibers, nested or concentric hollow tubes, honeycomb structures, and the like.

Compared to ceramic supports, polyamide-imide polymer (e.g., TORLON®) hollow fibers were not sufficiently stable to use the same or similar ZIF-90 synthesis conditions reported in literature. Specifically, reported literature procedures require aminopropyltriethoxysilane as a reagent to covalently link the aldehyde moiety of ImCa ligands to the surface of an alumina support before secondary growth in DMF at about 100° C. for about 18 hours. Polyamide-imide polymer (e.g., TORLON®) and many other polymers are not stable in the presence of DMF or amines. Therefore, different synthetic conditions were developed in this invention to grow ZIF-90 membranes on polymeric supports.

Since published reports use aminopropyltriethoxysilane to induce nucleation on the support surface and polyamide-imide polymer (e.g., TORLON®) are degraded in the presence of amines, an alternative seeding method was developed to facilitate growth on the surface instead of crystallization in the bulk solution. After synthesizing seed crystals and dispersing them in a suitable solvent, the crystals were then deposited using a column with a beret to control deposition rate.

Water and then methanol were the first two solvents tested for secondary membrane growth. While polyamide-imide polymer (e.g., TORLON®) is stable in both solvents, water was quickly eliminated as a suitable solvent as the ligand is only soluble at elevated temperatures. The poor solubility of ImCa in water creates a steep concentration gradient during secondary growth, thereby inhibiting homogenous film formation. Conversely, ImCa is soluble in methanol at room temperature (after sonication) and was adopted as the secondary growth solvent. Compared to the published existing procedure in DMF, the metal:ligand ratio had to be increased from 1:2 to 1:4, respectively, for highly intergrown films to be synthesized. Also, this higher metal to ligand ratio in methanol reduced the synthesis time from about 18 hours to about 4 hours as well as reduced the membrane thickness.

Using ZIF-90 as an exemplary ZIF, we finally demonstrated that it was possible to synthesize continuous ZIF membranes on polymeric hollow fiber surfaces by facile, low-temperature, technologically scalable methods.

Generally speaking, the method begins with highly uniform ZIF nanocrystals (~400 nm), synthesized for use as seed particles of membrane growth. A dip-coating technique is used to disperse these nanoparticles on the surfaces of macroporous hollow fibers of the porous polymer. Generally, the method employs a suspension of nanoscale crystals suspended in a solvent able to penetrate the pores of the polymer by capillary action, and this provides a uniform, stable seed coating that can then be grown by traditional methods.

Thereafter, we demonstrated the growth of continuous ZIF membranes on the polyamide-imide polymer (e.g., TORLON®) hollow fibers by a low-temperature (about 65° C.) liquid-phase crystal growth process, and characterized the structure and composition of the fiber-supported ZIF membranes by a number of techniques. Finally, we reported gas and liquid permeation properties of the ZIF polyamide-imide polymer (e.g., TORLON®) membrane.

It is expected that the methodology will be equally applicable to all MOF crystals, and indeed, our preliminary work with ZIF-8 and ZIF-90 suggests its broad applicability. Further, since the method relies on capillary penetration of the support, rather than any chemical reactions therewith, we predict that any porous polymer can be used, although the solvent will be varied according to the chemical properties of the support, such that a more hydrophobic support will require a more hydrophobic solvent.

The following descriptions are illustrative only, and are not intended to unduly limit the scope of the invention.

ZIF-90 Membranes

Uniform, submicron ZIF-90 seed crystals were synthesized by the addition of methanol to the synthesis as a non-solvent, as described in U.S. application Ser. No. 13/399,645 and Bae, et al. (2010). By separating the metal source in the non-solvent and the imidazole carboxyaldehyde ligand in DMF until the time of mixing, small ZIF-90 crystals were synthesized with a very narrow size distribution.

First, 1.920 g (20 mmol) imidizole carboxyaldehyde (ACROS™) was added to 50 mL DMF and heated to about 70° C. until dissolved. After cooling to room temperature, a mixture consisting of 1.485 g (5 mmol) zinc nitrate hexahydrate (SIGMA ALDRICH™) dissolved in 50 mL methanol was rapidly poured into the ImCa/DMF solution and mixed for about 30 minutes. ZIF-90 crystals were separated from the cloudy suspension by three cycles of centrifugation and washing in methanol.

Figure 1B:
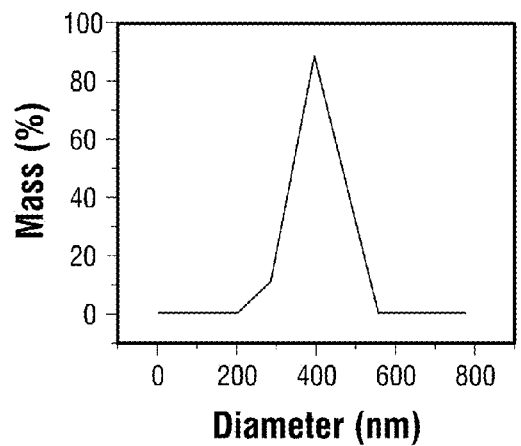
FIG. 1B illustrates a chart of Diameter (nm) vs. Mass (%), estimating particle size distribution from Dynamic Light Scattering (DLS) according to an embodiment of the present invention.
Figure 1C:
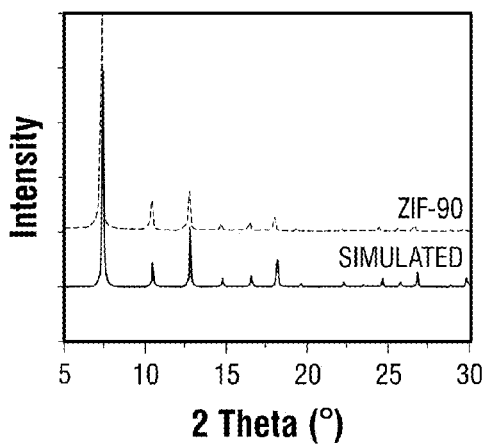
FIG. 1C illustrates a chart of 2 Theta (°) vs. Intensity of ZIF-90 particles from Xray Diffraction (XRD), comparing simulated and measured XRD patterns of ZIF-90 structure according to an embodiment of the present invention.
Figure 1D:
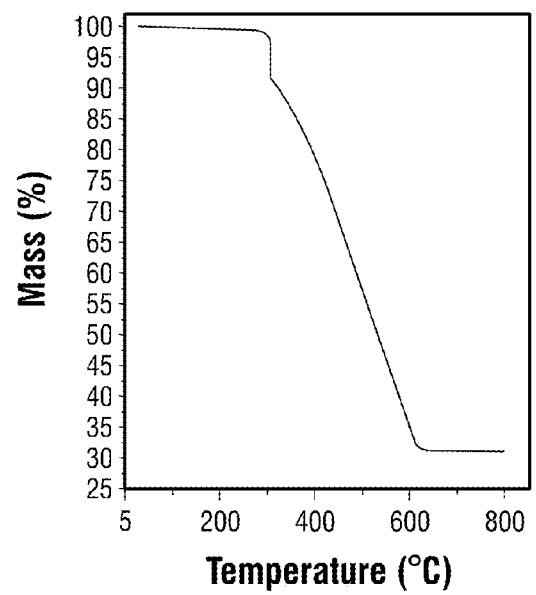
FIG. 1D illustrates a chart of Temperature (° C.) vs. Mass (%) of ZIF-90 particles, showing the thermogravimetric profile of the ZIF-90 particles according to an embodiment of the present invention.

X-Ray diffraction patterns were collected with a X'PERT™ diffractometer (PHILIPS™) equipped with an RTMS (X'CELERATOR™) detector using Cu Kα radiation. A LEO-1550 SEM was used to collect images on powders and films after a thin layer of gold was sputtered onto the sample surface. DLS measurements were conducted with a PROTEIN SOLUTIONS DYNAPRO DLS™ instrument. Particles were dispersed in methanol and then transferred to a cuvette with a 5 micron syringe filter. A NETZSCH STA 409 PG LUXX™ was used for thermogravimetric analysis (TGA). Colloidal ZIF-90 seed crystals (see FIG. 1A) with a narrow size distribution (mean=397 nm and standard deviation=14 nm) were produced (see FIG. 1B). XRD confirmed the presence of a highly crystalline ZIF-90 structure without any impurity phases (see FIG. 1C). Based on the thermogravimetric trace, the structure was stable until 300° C. before any decomposition occurred (see FIG. 1D). Furthermore, the solvent was easily evacuated from the pores by drying in an oven at about 60° C. for about 48 hours.

To synthesize a ZIF-90 polyamide-imide polymer (e.g., TORLON®) hollow fiber membrane, the ends of polyamide-imide polymer (e.g., TORLON®) fiber sections (about 8-inches in length) were first sealed with epoxy (by dipping the ends) to prevent crystal growth on the inner fiber surface. The polyamide-imide polymer (e.g., TORLON®) hollow fibers were produced in-house by a technique described elsewhere (Jang, et al., 2011), but such fibers are also commercially available. It is also possible to use a larger hollow fiber (tubes), and grow crystals on both surfaces.

Figure 2A:
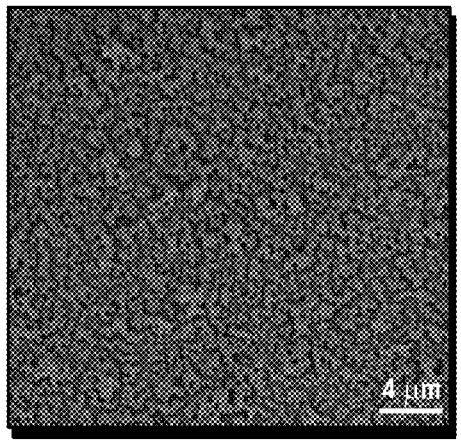
FIG. 2A illustrates a SEM image of a ZIF-90 seed-layer according to an embodiment of the present invention.
Figure 2B:
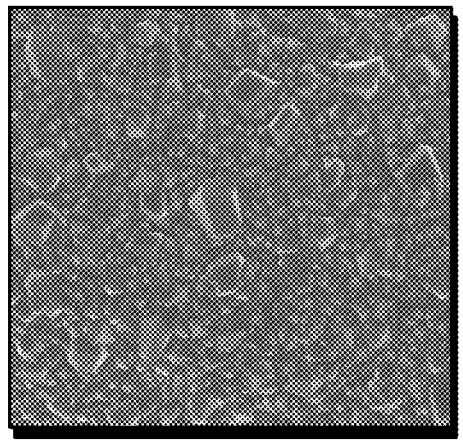
FIG. 2B illustrates a top view of polycrystalline ZIF-90 membrane after secondary growth according to an embodiment of the present invention.

Attempts to grow ZIF-90 films without the presence of seed crystals on fiber surfaces resulted in poorly intergrown crystals populating the fiber surface (see FIG. 2A), highlighting the critical importance of seeding the fiber surface. For this purpose, the fibers were dip-coated into a 4 g/L ZIF-90/methanol suspension and air-dried for about 30 minutes before secondary growth. This resulted in a dense layer of ZIF-90 seed crystals being deposited on the fiber surface (see FIG. 2B) of nm thickness.

For fabricating ZIF-90 membranes, a growth solution was prepared by first adding 960 mg imidizole carboxyaldehyde to 100 mL methanol, followed by sonication until the ligand dissolved. Then, 740 mg zinc nitrate hexahydrate was added to the solution after cooling to room temperature. The growth solution was then poured into a 100 mL KIMAX® test tube to which a seeded fiber was added. The tubes were then capped and heated in a convection oven to about 65° C. After about 4 hours, the tubes were cooled under ambient conditions, and the fibers were thoroughly rinsed with methanol.

It is also possible to grow crystals by crystallization from a saturated solution, but care should be taken with the conditions so as not to grow crystals that are too large, and the preferred method is as described herein.

Figure 2C:
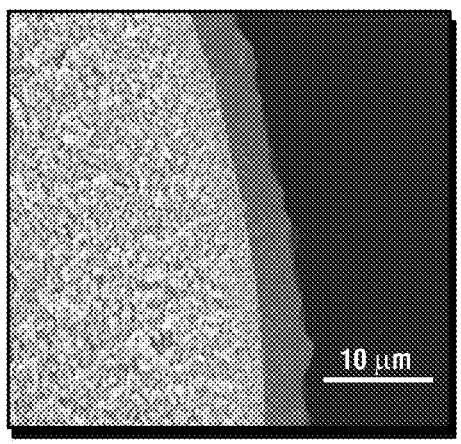
FIG. 2C illustrates cross-sectional views of polycrystalline ZIF-90 membrane after secondary growth according to an embodiment of the present invention.
Figure 2D:
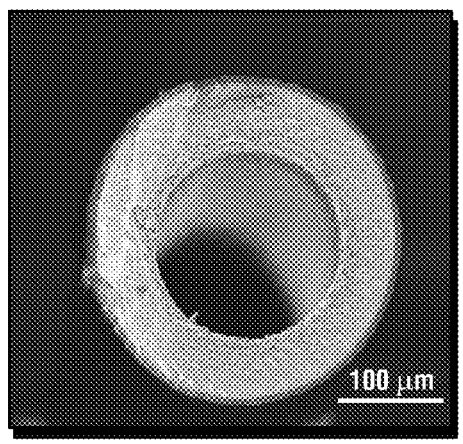
FIG. 2D illustrates cross-sectional views of polycrystalline ZIF-90 membrane after secondary growth according to an embodiment of the present invention.
Figure 2E:
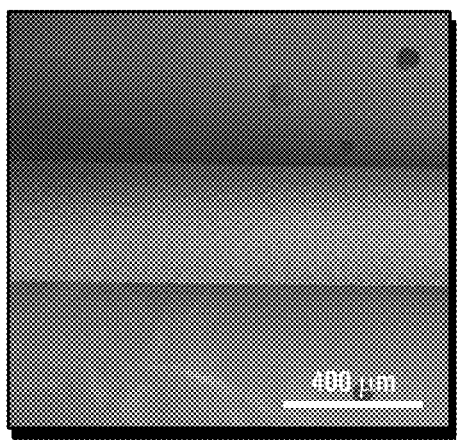
FIG. 2E illustrates a low-magnification view showing complete coverage of the fiber surface by the ZIF-90 membrane according to an embodiment of the present invention.
Figure 2F:
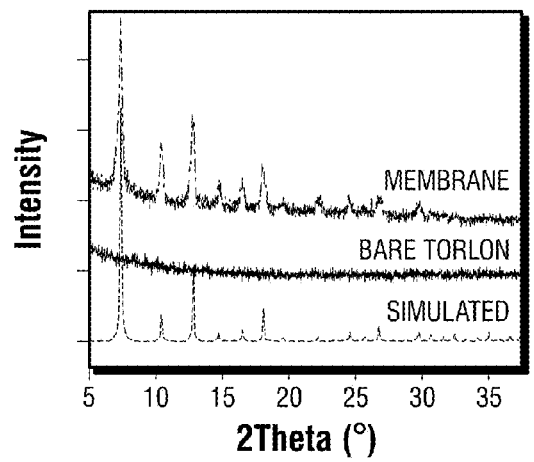
FIG. 2F illustrates a chart of 2 Theta (°) vs. Intensity of bare polyamide-imide polymer (e.g., TORLON®) and the final membrane from XRD, comparing XRD patterns of the bare polyamide-imide polymer and final ZIF-90 polyamide-imide polymer membrane according to embodiments of the present invention.

Highly intergrown, polycrystalline membranes were obtained that covered the entire fiber surface with no visible gaps, pinholes, or cracks (see FIGS. 2C-2E). XRD confirmed the crystal structure of ZIF-90 and that the crystals in the membrane are randomly oriented (see FIG. 2F). Membrane thicknesses were approximately 4-5 microns, but thickness can be controlled by increasing or decreasing crystal growth time, and/or temperature, as desired.

In order to evaluate the quality of the membrane filters so-produced, a variety of data were collected. Single-gas permeation data for $H_2$, $CO_2$, $N_2$, $CH_4$, and $SF_6$ were collected at 35° C. using a time-lag method described elsewhere (McCarthy, et al., 2010). Gases were fed at 50 psia (3.4 atm) into the bore of a fiber, mounted in a module, while the permeate side was under vacuum at approximately 0.03 psia. After reaching steady-state, the radial gas flux through the fiber was measured by isolating the vacuum pump, and normalizing the rise in permeate pressure by the feed pressure and area to obtain the permeance. Gas Permeation Units (1 GPU=$10^{-6}$ cm$^3$ (STP) cm$^{-2}$ s$^{-1}$ cm Hg$^{-1}$) were used to report permeance values. Data is shown in Table 1 (see FIG. 5).

Single-component pervaporation data for water, isobutanol, isopentanol, hexane, benzene, and n-hexane were collected with a set-up described elsewhere (Qui, et al., 2009). Fibers were first mounted horizontally with epoxy (3M, DP-100) in a glass module, to which 300 mL of feed solution was then added and sealed with an O-ring. Vacuum was then applied to both ends of the mounted fiber through the bore. After about 1-2 hours, the mass of permeate in the liquid nitrogen-cooled collection trap was recorded. Measurements were performed at room temperature (about 22° C.). For consistency, we use Gas Permeation Units (1 GPU=$10^{-6}$ cm$^3$ (STP) cm$^{-2}$ s$^{-1}$ cm Hg$^{-1}$) to report permeances of both gases and liquids. In the case of gas permeation, the permeance was calculated by dividing the flux by the gas-pressure driving force across the membrane, whereas in pervaporation the vapor-pressure driving force was used.

Figure 3A:
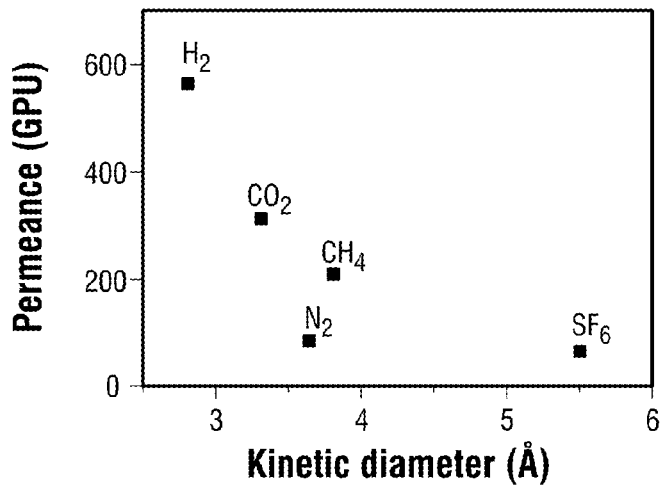
FIG. 3A illustrates a chart of Kinetic diameter (Å) vs. Permeance (GPU) of various gases at 35° C. and 50 psia.
Figure 3B:
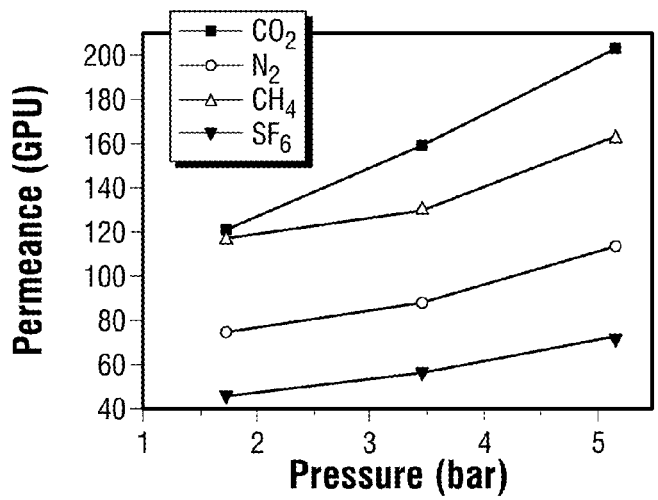
FIG. 3B illustrates a chart of Pressure (bar) vs. Permeance (GPU) of various gases at 70° C.
Figure 3C:
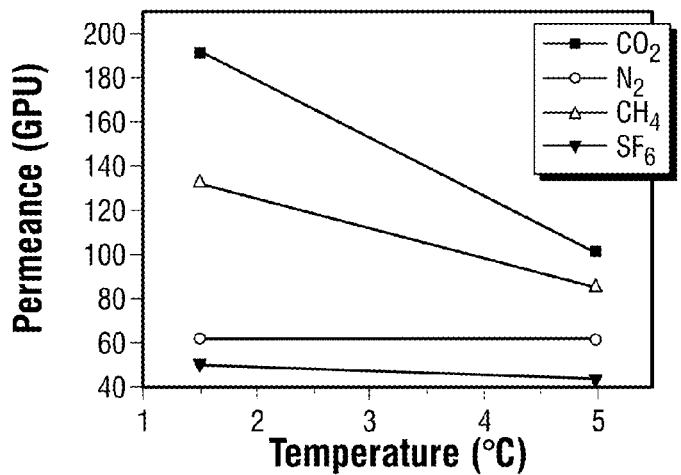
FIG. 3C illustrates a chart of Temperature (° C.) vs. Permeance (GPU) of various gases at 50 psia.

Single-component gas permeation data for the ZIF-90 polyamide-imide polymer (e.g., TORLON®) hollow fiber membrane is shown in FIGS. 3A-3C. Gases ranging in kinetic diameter from 0.28 nm ($H_2$) to 0.55 nm ($SF_6$) were used to characterize the transport mechanisms. The gases show a strong trend of decreasing permeance with increasing kinetic diameter (see FIG. 3A), clearly indicating that the permeation properties are influenced by transport through the ZIF-90 pores and not through defects such as pinholes, cracks, or grain boundaries. The $CO_2/N_2$ and $CO_2/CH_4$ selectivities of 3.5 and 1.5 are comparable to previous reports on ZIF membranes (see Table 1 (FIG. 5)) and are well above the Knudsen selectivities (0.8 and 0.6, respectively), further confirming that gas transport is governed by transport through the ZIF-90 crystals.

Interestingly, the $CO_2/CH_4$ selectivity was lower than the $CO_2/N_2$ selectivity. ZIF materials are known to have high $CO_2$ adsorption capacities, and typically also adsorb $CH_4$ more strongly than $N_2$. Thus, selective adsorption of gases is also likely to contribute significantly to the selectivity in ZIF-90 membranes, and it is not purely a molecular sieving phenomenon. This is further corroborated by the significant permeance of $SF_6$, whose kinetic diameter of 0.55 nm is considerably larger than the nominal pore size of ZIF-90 (0.35 nm).

The $N_2/SF_6$ selectivity of 1.6 is lower than the Knudsen selectivity (2.3). This low selectivity is not due to membrane defects, since the other gas selectivities are higher than the Knudsen baseline. To investigate further, permeation data were also collected at a higher temperature (70° C.) and at feed pressures of 25-75 psia with the permeate pressure being under vacuum. As seen from FIG. 3B (data measured at 50 psia), the permeance decreases significantly for all gases as the temperature is increased from 35° C. to 70° C., with $CO_2$ showing the largest reduction (from 317 GPU to 159 GPU). Furthermore (see FIG. 3C), all the gas permeances increase with feed pressure at fixed temperature, and the selectivities for all gas pairs increase initially with feed pressure and then approach saturation at higher pressures.

The above observations are consistent with a strong role of adsorption characteristics in determining the permeation behavior, and may also indicate the influence of ZIF-90 flexibility allowing the adsorption of molecules, such as $SF_6$, that are considerably larger than the crystallographic pore size of ZIF-90. The gas permeabilities (obtained from the permeances by multiplication with the membrane thickness) are high, and within the range shown in Table 1 (see FIG. 5). For example, with an estimated membrane thickness of 5 μm, the $CO_2$ permeability is 1587 Barrers at 35° C. and 50 psia feed pressure.

Figure 4:
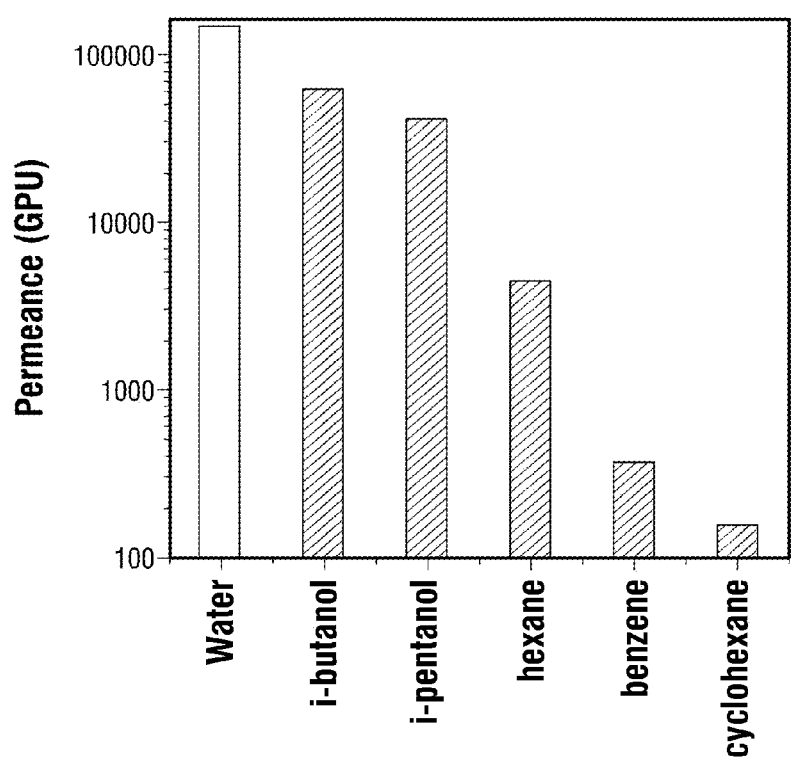
FIG. 4 shows a chart of single-component compositions in water vs. Permeance (GPU) for various organic components at 22° C., measured via pervaporation through a ZIF-90 polyamide-imide polymer (e.g., TORLON®) membrane according to an embodiment of the present invention.
Figure 6A:
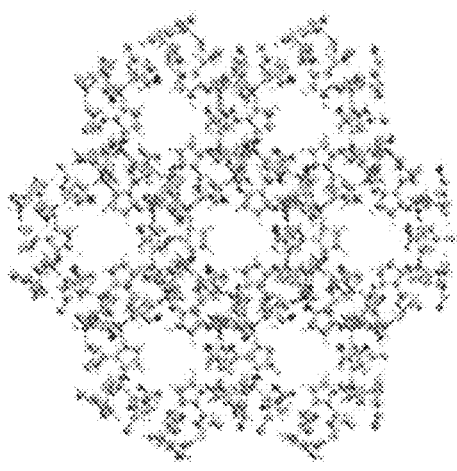
FIG. 6A illustrates the structure of ZIF-90 in the [111] direction.
Figure 6B:
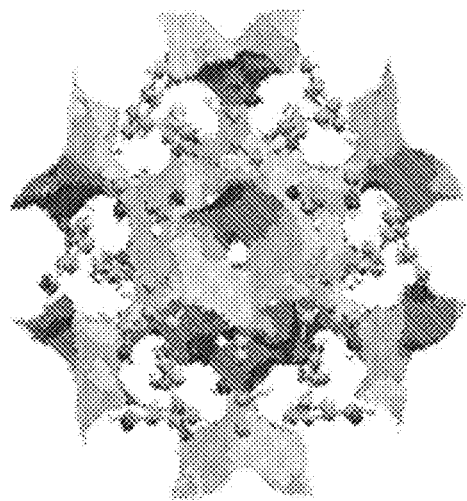
FIG. 6B illustrates the structure of a single unit cell of ZIF-90, showing the one-dimensional channels available for molecular adsorption and diffusion.

In addition to gas permeation properties, we also report initial data on pervaporation of organic molecules through the ZIF-90 polyamide-imide polymer (e.g., TORLON®) hollow fiber membrane (see FIG. 4). The water permeance of a bare polyamide-imide polymer (e.g., Torion®) fiber (~1.8 million GPU) decreased to 145,000 GPU after the growth of the ZIF-90 membrane on the fiber. The ZIF-90 polyamide-imide polymer (e.g., TORLON®) membrane is selective for water over alcohols and hydrocarbons, the latter having a much lower permeance. This behavior is inverse to that observed from a polymer/ZIF-8 composite dense film, which preferentially permeated isobutanol over water (Liu, 2011b). Due to the presence of the more hydrophilic aldehyde groups in the pore windows of ZIF-90 compared to the hydrophobic methyl groups present in ZIF-8, water permeates much faster in ZIF-90. The largest molecules measured were benzene and cyclohexane, which also had the lowest permeances of 370 GPU and 160 GPU, respectively.

In summary, this example demonstrates that MOF membranes can be fabricated by a technologically scalable low-temperature process on porous polymeric hollow fiber supports, with achievement of complete surface coverage and a lack of mesoscopic or macroscopic defects. The gas separation factors of the ZIF-90 polyamide-imide polymer (e.g., Torion®) membrane reported here are modest and consistent with previous literature on ceramic-supported ZIF membranes, but the liquid separation factors are higher. The present work leads the way to hollow-fiber membranes that can be scaled up for the fabrication of high-surface area membrane modules.

ZIF-8 Membranes

We have already made ZIF-8 polyamide-imide polymer (e.g., Torion®) membrane using nanoscale ZIF-8 and methanol, in the manner described above. Preliminary data suggests that the work has been successful, although work is ongoing to fully characterize the resulting membrane.

Other MOF Crystals

The method has general applicability to MOFs for which submicron seed crystals are available, such as MOF-508b and Cu-HFIPBB. Our future experiments may test one or more MOFs for compatibility with the inventive method. We predict that the resulting membranes will function as determined by the properties of the constituent MOF, and not be limited by the presence of membrane defects.

Other Polymers

In the future, we may also show that the method has general applicability to various polymeric supports, such as asymmetric polysulfone (PS), symmetric polyethylene (PE), asymmetric polyacrilonitrile (PAN), hydrophilic polyethersulfone (PES), polyvinylidene difluoride (PVDF), symmetric polyvinylidene fluoride (PVDF), polydimethylsiloxane (PDMS), poly(3-octylthiophene) (POT), and poly (3-(2-acetoxyethylthiophene) (PAET), polyimide, poly(vinyl acetate) (PVAc), and the like.

We predict that the resulting membranes will be fully functional, because the porous polymer provides only the support structure for the MOF crystals. The above polymers are expected to be stable in water and alcohols, but DMF and dimethyl sulfoxide (DMSO) may solubilize most of the above polymers due to high polarity. Also, the ZIF-90 membranes should be able to grow on chemically diverse sets of polymers, as van der Waals forces are strong enough to allow particles to adhere to the surface. The surfaces of MOFs are typically covered with pendant OH and/or NH groups, and therefore polymers that contain H bonded to electronegative elements (i.e., F, O, N) are well-suited for membrane growth due to the increased adhesion via hydrogen bonding networks.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

DEFINITIONS

As used herein, the terms "a," "an," "the," and "said" when used in conjunction with the term "comprising" means one or more, unless the context dictates otherwise.

As used herein, the term "about" means the stated value plus or minus a margin of error or plus or minus 10% if no method of measurement is indicated.

As used herein, the term "or" means "and/or" unless explicitly indicated to refer to alternatives only or if the alternatives are mutually exclusive.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise," provided above.

As used herein, the terms "having," "has," and "have" have the same open-ended meaning as "comprising," "comprises," and "comprise," provided above.

As used herein, the terms "including," "includes," and "include" have the same open-ended meaning as "comprising," "comprises," and "comprise," provided above.

As used herein, the phrase "consisting of" is a closed transition term used to transition from a subject recited before the term to one or more material elements recited after the term, where the material element or elements listed after the transition term are the only material elements that make up the subject.

As used herein, the phrase "consisting essentially of" occupies a middle ground, allowing the addition of non-material elements that do not substantially change the nature of the invention, such as various buffers, differing salts, extra wash or precipitation steps, pH modifiers, and the like.

As used herein, the phrase "growth solvent" means a liquid in which the MOF seed crystals can be increased in size, either by crystal deposition or synthesis, but without harming the polymer.

As used herein, the phrase "nanocrystals" means the seed crystals have an average size of less than one micron, preferably about 400-600 nm, and a size distribution of +/−10%. For polymers with very small pores, a smaller seed crystal may be needed, and therefore the seed crystal size can be reduced as needed.

As used herein, the phrase "non-solvent" means a liquid in which the MOF precursors have a low solubility, such that on introducing the non-solvent to the mixture, the precursors are unable to stay in solution and condense quickly to form a large number of nuclei, which are the seeds for growing a large number of very small crystals.

As used herein, the phrase "seed solvent" means a liquid in which the MOF nanocrystals can be carried into the pores of the polymer. Thus, the seed crystals should have low solubility in the solvent and the solvent should penetrate or wet the pores of the polymer, but without harming the polymer.

As used herein, the term "simultaneously" means occurring at the same time or about the same time, including concurrently.

As used herein, "starting material" means that the recited chemical is made or purchased for use as an early reactant in the synthetic pathway. However, if made, rather than purchased, there may be other ingredients that pre-date same.

ABBREVIATIONS

The following abbreviations are used herein:

| | |
|---|---|
| BTC | 1,3,5-benzenetricarboxylate |
| COF | Covalent organic framework |
| CMP | Conjugated microporous polymer |
| Cu[(hfipbb)(H$_2$hfipbb)$_{0.5}$] or Cu-hfipbb | Cu(4,4'-hexafluoroisopropylidene-bis-benzoate) |
| CuBTC | Cu$_3$(BTC)$_2$ aka HKUST-1 |
| DI | Deionized water |
| DMF | Dimethylformamide |
| DMSO | Dimethyl sulfoxide |
| DLS | Dynamic light scattering |
| MIL-53(Fe) | FeIII(OH)(O$_2$C—C$_6$H$_4$—CO$_2$) [Fe$_4$(OH)(O$_2$C—C$_6$H$_4$—CO$_2$)$_4$ per unit-cell |
| MOF | Metal organic framework |
| MOF-508b | Metal organic framework 508b |
| SBU | Secondary building unit |
| SEM | Scanning electron microscope |
| Si02 | Silica, source Ludox AS-30 colloidal silica |
| XRD | Xray diffraction |
| ZIF | Zeolitic imidazolate framework |
| ZIF-7 | Zeolitic imidazolate framework 7 |
| ZIF-8 | Zeolitic imidazolate framework 8 |
| ZIF-90 | Zeolitic imidazolate framework 90 |
| ZnBTC | Zinc BTC |
| ImCa | Imidizole carboxyaldehyde |

INCORPORATION BY REFERENCE

All patents and patent applications, articles, reports, and other documents cited herein are fully incorporated by reference to the extent they are not inconsistent with this invention. In particular, the following are incorporated by reference herein in their entirety:

U.S. patent application Ser. No. 13/399,645.
U.S. patent application Ser. No. 13/396,411.
Aguado, S., et al., *Facile synthesis of an ultramicroporous MOF tubular membrane with selectivity towards CO$_2$*, NEW J. CHEM. 35 (2011) 41.
Bae, T. H., et al., *A high-performance gas-separation membrane containing submicrometer-sized metal—organic framework crystals*, ANGEW. CHEM.-INT. EDIT. 49 (2010) 9863-66.
Bux, H., et al., *Oriented zeolitic imidazolate framework-8 membrane with sharp H2/C3H8 molecular sieve separation*, CHEM. MATER. 23 (2011) 2262.
Bux, H. et al., *Zeolitic imidazolate framework membrane with molecular sieving properties by microwave-assisted solvothermal synthesis*, J. AM. CHEM. SOC. 131 (2009) 16000.
Centrone, A., et al., *Growth of metal-organic frameworks on polymer surfaces*, J. AM. CHEM. SOC. 132 (2010) 15687.
Ge, Q., et al., *High-performance zeolite NaA membranes on polymer—zeolite composite hollow fiber supports*, J. AM. CHEM. SOC. 131(47) (2009) 17056-57.
Huang, A. S., & Caro, J., *Covalent post-functionalization of zeolitic imidazolate framework ZIF-90 membrane for enhanced hydrogen selectivity*, ANGEW. CHEM.-INT. EDIT. 50 (2011) 4979.
Huang, A., et al., *Steam-stable zeolitic imidazolate framework ZIF-90 membrane with hydrogen selectivity through covalent functionalization*, J. AM. CHEM. SOC. 132 (2010a) 15562.
Huang, A. S. et al., *Molecular sieve membrane with hydrogen permselectivity: ZIF-22 in LTA topology prepared with 3-aminopropyltriethoxysilane as covalent linker*, ANGEW. CHEM.-INT. EDIT. 49 (2010b) 4958.
Jong, K. S., et al., *Modified mesoporous silica gas separation membranes on polymeric hollow fibers*, CHEMISTRY OF MATERIALS 23(12) (2011) 3025-28.
Li, Y. S., et al., *Molecular sieve membrane: supported metal-organic framework with high hydrogen selectivity*, ANGEW. CHEM.-INT. EDIT. 49 (2009) 548.
Liu, Y. Y. et al., *Synthesis and characterization of ZIF-69 membranes and separation for CO2/C0 mixture*, J. MEMBR. SCI. 353 (2010) 36.
Liu, Y. Y., et al., *Synthesis of highly c-oriented ZIF-69 membranes by secondary growth and their gas permeation properties*, J. MEMBR. SCI. 379 (2011a) 46.
Liu, X. L., *An Organophilic pervaporation membrane derived from metal—organic framework nanoparticles for efficient recovery of bio-alcohol*, CHEM.-INT. EDIT. 50 (2011b) 10636.
McCarthy, M. C., et al., *Synthesis of zeolitic imidazolate framework films and membranes with controlled microstructures*, LANGMUIR 26 (2010) 14636.
Pan, Y. & Lai, Z., *Sharp separation of C2/C3 hydrocarbon mixtures by zeolitic imidazolate framework-8 (ZIF-8) membranes synthesized in aqueous solutions*, CHEM. COMMUN. 47 (2011) 10275.
Venna, S. R. & Carreon, M. A., *Highly permeable zeolite imidazolate framework-8 membranes for CO$_2$/CH$_4$ separation*, J. AM. CHEM. SOC. 132 (2009) 76.
Qiu, W. L., et al., *Dehydration of ethanol-water mixtures using asymmetric hollow fiber membranes from commercial polyimides*, J. MEMBR. SCI. 327 (2009) 96.
Xu, G., et al., *Preparation of ZIF-8 membranes supported on ceramic hollow fibers from a concentrated synthesis gel*, J. MEMBR. SCI. 187 (2011) 385-86.
Yao, J., et al, *Contra-diffusion synthesis of ZIF-8 films on a polymer substrate*, CHEM. COMMUN. 47 (2011) 2559.

What is claimed is:

1. A method of preparing a MOF-membrane-polymer, comprising:
   a) dip-coating a porous polymer with a seed solution comprising MOF nanocrystals of average size <1 micron suspended in a first solvent that can penetrate the porous polymer, wherein the seed solution comprises about 0.4 wt % MOF nanocrystals in the first solvent, and wherein the first solvent is selected from the group consisting of water, methanol, ethanol, propanol, butanol, chloroform, toluene, hexane, and combinations thereof, with the proviso that the first solvent does not solubilize the porous polymer;
   b) drying the dip-coated porous polymer;
   c) growing larger MOF crystals on the dip-coated porous polymer at less than 100° C. in a growth solution to make a MOF-membrane-polymer, the growth solution comprising MOF precursors solubilized in a second solvent, wherein the growth solution comprises 0.5-1.0 wt % ligand and 0.5-1.0 wt % zinc in the second solvent, and wherein the second solvent is independently selected from the group consisting of ethanol, propanol, butanol, chloroform, toluene, hexane, and combinations thereof, with the proviso that the second solvent does not solubilize the porous polymer; and
   d) rinsing and drying the MOF-membrane-polymer.

2. The method of claim 1, wherein the porous polymer is in the shape of a film, a fiber or a hollow fiber.

3. The method of claim 1, wherein each of the first solvent and the second solvent is independently selected from the group consisting of ethanol, propanol, butanol, chloroform, toluene, hexane, and combinations thereof, with the proviso that each of the first solvent and the second solvent does not solubilize the porous polymer.

4. The method of claim 1, wherein the MOF is a ZIF and each of the first solvent and the second solvent is an alcohol independently selected from the group consisting of ethanol, propanol, butanol, and combinations thereof, with the proviso that each of the first solvent and the second solvent does not solubilize the porous polymer.

5. The method of claim 1, wherein the MOF is a ZIF and each of the first solvent and the second solvent is selected from the group consisting of ethanol, propanol, butanol, chloroform, toluene, hexane, and combinations thereof, with the proviso that each of the first solvent and the second solvent does not solubilize the porous polymer.

6. The method of claim 1, wherein the MOF is a ZIF and each of the first solvent and the second solvent is selected from the group consisting of ethanol, propanol, butanol, chloroform, and combinations thereof, with the proviso that each of the first solvent and the second solvent does not solubilize the porous polymer.

7. The method of claim 4, wherein the growth solution comprises 0.5-1.0% of imidazole carboxyaldehyde and 0.5-1.0% zinc (II) nitrate in the second solvent.

8. The method of claim 1, wherein the growth solution comprises 0.5-1.0% of imidizole carboxyaldehyde and 0.5-1.0% zinc (II) nitrate in the second solvent.

9. The method of claim 1, wherein the seed solution comprises about 0.4 wt % ZIF nanocrystals in ethanol.

10. The method of claim 1, wherein the MOF nanocrystals are of average size 200-600 nm.

11. The method of claim 1, wherein the MOF nanocrystals are of average size 400 nm.

12. The method of claim 4, wherein the ZIF nanocrystals are of average size 400 nm.

13. The method of claim 1, wherein the porous polymer is selected from the group consisting of polysulfone (PS), polyethylene (PE), polyacrilonitrile (PAN), polyethersulfone (PES), polyetherimide (PEI), poly(amide-imide) (PAI), polyvinylidene difluoride (PVDF), polyvinylidene fluoride (PVDF), polydimethylsiloxane (PDMS), poly(3-octylthiophene) (POT), poly (3-(2-acetoxyethylthiophene) (PAET), polyimide, polyamide, polyetheretherketones (PEEK), and poly(vinyl acetate) (PVAc), polypropylene, cellulose acetate, 2,2-bis(3,4-carboxyphenyl) hexafluoropropane dianhydride-diaminomesitylene) (6FDA-DAM) and derivatives thereof.

14. The method of claim 1, wherein the porous polymer comprises poly(amide-imide).

15. The method of claim 1, wherein the porous polymer is shaped as a hollow tube.

16. The method of claim 1, wherein the porous polymer is shaped as a hollow tube and the ends are sealed before step a).

17. The method of claim 1, wherein the growing step occurs at 60-70° C.

18. The method of claim 1, wherein the growing step occurs at 65° C.

19. The method of claim 4, wherein the ZIF is ZIF-90.

20. The method of claim 4, wherein the ZIF is ZIF-8.

21. A method of preparing ZIF membranes on polymeric supports, comprising:
  a) dip-coating a porous polymer using a seed solution comprising about 0.4 wt % ZIF nanocrystals of average size <0.5 micron suspended in a first alcohol that can penetrate the porous polymer;
  b) drying the dip-coated porous polymer;
  c) growing larger ZIF crystals on the dip-coated porous polymer at less than 100° C. in a growth solution comprising 0.1-2.0 wt % ZIF precursors in a second alcohol to make a ZIF membrane, wherein the second alcohol is selected from the group consisting of ethanol, propanol, butanol, and combinations thereof; and
  d) rinsing and drying the ZIF membrane.

22. The method of claim 21, wherein the ZIF is ZIF-90 and the ZIF precursors are imidizole carboxyaldehyde and zinc (II) nitrate.

23. The method of claim 21, wherein the ZIF is ZIF-8 and the ZIF precursors are 2-methylimidazole and zinc (II) nitrate.

24. The method of claim 21, wherein the porous polymer is selected from the group consisting of polysulfone (PS), polyethylene (PE), polyacrilonitrile (PAN), polyethersulfone (PES), polyetherimide (PEI), poly(amide-imide) (PAI), polyvinylidene difluoride (PVDF), polyvinylidene fluoride (PVDF), polydimethylsiloxane (PDMS), poly(3-octylthiophene) (POT), poly (3-(2-acetoxyethylthiophene) (PAET), polyimide, polyamide, polyetheretherketones (PEEK), and poly(vinyl acetate) (PVAc), polypropylene, cellulose acetate, 2,2-bis(3,4-carboxyphenyl) hexafluoropropane dianhydride-diaminomesitylene) (6FDA-DAM), and derivatives thereof.

25. A filter, comprising the MOF polymer membrane of claim 1.

26. A filter, comprising the ZIF membrane of claim 21.

27. A method of separating $CO_2$ from a mixture of gases, comprising:
  a) applying a mixture of gases including $CO_2$ to the MOF polymer membrane of claim 1, and
  b) separating the $CO_2$ from the remaining mixture of gases.

28. A method of separating a chemical from a mixture of chemicals, comprising:
  a) applying a mixture of chemicals to the MOF polymer membrane of claim 1; and
  b) separating a chemical from the remaining mixture of chemicals.

29. A method of seed coating porous polymeric supports, comprising:
  a) dip-coating a porous polymer fiber with a seed solution comprising MOF nanocrystals of average size <1 micron suspended in a first solvent that can penetrate the porous polymer, wherein the seed solution comprises about 0.4 wt % MOF nanocrystals in the first solvent and wherein the first solvent is selected from the group consisting of water, methanol, ethanol, propanol, butanol, chloroform, toluene, hexane, and combinations thereof, with the proviso that the first solvent does not solubilize the porous polymer fiber;
  b) drying the dip-coated porous polymer fiber; and
  c) growing larger MOF crystals on the dip-coated porous polymer at less than 100° C. in a growth solution comprising 0.1-2.0 wt % ZIF precursors in a second solvent to make a ZIF membrane, wherein the second solvent is selected from the group consisting of ethanol, propanol, butanol, and combinations thereof, with the proviso that the second solvent does not solubilize the porous polymer fiber.

30. The method of claim 29, wherein the MOF is a ZIF and the first solvent is an alcohol selected from the group consisting of water, methanol, ethanol, propanol, butanol and combinations thereof.

31. The method of claim 29, wherein the seed solution comprises about 0.4 wt % ZIF nanocrystals in ethanol.

32. A method of growing MOF crystals on a MOF seeded porous polymer, comprising:
  a) growing larger MOF crystals on a MOF seeded porous polymer at less than 100° C. in a growth solution to make a MOF-membrane-polymer, the growth solution comprising MOF precursors solubilized in a second solvent, wherein the second solvent is selected from the group consisting of ethanol, propanol, butanol, chloroform, toluene, hexane, and combinations thereof, with the proviso that the second solvent does not solubilize the porous polymer; and
  b) rinsing and drying the MOF-membrane-polymer.

33. The method of claim 32, wherein the MOF is a ZIF and the second solvent is an alcohol selected from the group consisting of ethanol, propanol, butanol, and combinations thereof.

34. The method of claim 32, wherein the porous polymer is selected from the group consisting of polysulfone (PS), polyethylene (PE), polyacrilonitrile (PAN), polyethersulfone (PES), polyetherimide (PEI), poly(amide-imide) (PAI), polyvinylidene difluoride (PVDF), polyvinylidene fluoride (PVDF), polydimethylsiloxane (PDMS), poly(3-octylthiophene) (POT), poly (3-(2-acetoxyethylthiophene) (PAET), polyimide, polyamide, polyetheretherketones (PEEK), and poly(vinyl acetate) (PVAc), polypropylene, cellulose acetate, 2,2-bis(3,4-carboxyphenyl) hexafluoropropane dianhydride-diaminomesitylene) (6FDA-DAM), and derivatives thereof.

* * * * *